(12) United States Patent
Kurose et al.

(10) Patent No.: US 6,265,032 B1
(45) Date of Patent: Jul. 24, 2001

(54) METHOD FOR PRODUCTION OF MAGNETIC RECORDING MEDIUM

(75) Inventors: Shigeo Kurose; Akira Somiya, both of Saku (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 08/772,571

(22) Filed: Dec. 26, 1996

(30) Foreign Application Priority Data

Dec. 30, 1995 (JP) .................................................. 7-352548

(51) Int. Cl.[7] .................................................. H01F 1/00
(52) U.S. Cl. .................. 427/547; 427/131; 427/208; 427/407.1; 427/577; 427/599
(58) Field of Search .................................. 427/127–132, 427/599, 208, 577, 407.1, 547

(56) References Cited

U.S. PATENT DOCUMENTS

| | | | |
|---|---|---|---|
| 4,728,569 | * 3/1988 | Ryoke et al. | 428/323 |
| 4,844,946 | 7/1989 | Komatsu et al. | |
| 4,874,633 | * 10/1989 | Komatsu et al. | 427/48 |
| 5,494,732 | * 2/1996 | Ito et al. | 428/212 |
| 5,597,615 | * 1/1997 | Tsunoda et al. | 427/172 |

FOREIGN PATENT DOCUMENTS

| | | |
|---|---|---|
| 53-92110 | 8/1978 | (JP) . |
| 62-212933 | 9/1987 | (JP) . |
| 5-81667 | 4/1993 | (JP) . |
| 5-59490 | 8/1993 | (JP) . |
| 7-176047 | 7/1995 | (JP) . |
| 7-185437 | 7/1995 | (JP) . |
| 7-185449 | 7/1995 | (JP) . |

* cited by examiner

Primary Examiner—Bernard Pianalto
(74) Attorney, Agent, or Firm—Oblon, Spivak, McClelland, Maier & Neustadt, P.C.

(57) ABSTRACT

This invention permits formation of a magnetic coating excelling in the degree of orientation in spite of a decrease in the thickness thereof and ensures impartation of a high degree of packing and high durability to the magnetic layer of a small thickness because of the infallible presence of a backcoat layer in an undried state (particularly a wet state) while the magnetic layer is in an undried state (particularly a wet state). It also allows efficient formation of a backcoat layer which used to impose a heavy load on the conventional process of manufacture. Preferably, this invention has the calendering work performed in the in-line system such that the surface quality of the magnetic layer may be exalted by improving the operational efficiency of the calendering step and, as a result, the loss of the applied layer of the paint which used to occur during the course of the calendering step in the conventional separate line may be decreased.

20 Claims, 4 Drawing Sheets

METHOD FOR PRODUCTION OF MAGNETIC RECORDING MEDIUM

BACKGROUND OF THE INVENTION

1. Field of the Invention

This invention relates to a method for the production of a magnetic recording medium to be used for recording and reproducing images, voices, data, etc.

2. Description of the Prior Art

Heretofore, in the manufacture of a magnetic recording medium provided on a nonmagnetic support thereof with a magnetic layer containing a magnetic powder, the practice of forming a backcoat layer on the surface of the nonmagnetic support opposite the surface of the magnetic layer for the purpose of improving the running property of the medium itself has been in vogue. While the backcoat layer of this sort indeed contributes to the improvement of the running property, however, the fact itself of providing the backcoat layer for the magnetic recording medium necessitates a work of applying a paint to the support and drying the applied layer of the paint besides the work performed on the magnetic layer and consequently complicates the process of manufacture of the recording medium and directly bears on the cost of manufacture. Thus, the adoption of this practice has been limited to magnetic recording media of high quality. More often than not, the backcoat layer in popular use to date has incorporated therein a pigment of a large particle diameter for the principal purpose of improving the running property of the magnetic recording medium.

In recent years, the demand made by the magnetic recording medium for higher recording density has been urging the magnetic layer toward a smaller thickness, a greater degree of packing, and higher durability. Thus, targets of high level have come to be set for the magnetic layer.

For the purpose of realizing such a magnetic layer as is aimed at, it has been proposed to form the magnetic layer in a two-layer structure or provide the magnetic layer with an undercoat. Concerning the manufacture of the magnetic layer of such a modified structure as mentioned above, a study is now under way on the feasibility of adopting the wet-on-dry coating method which comprises first drying the lower layer and then forming the magnetic layer as an upper layer and the wet-on-wet method which comprises forming the layer on the lower side and the magnetic layer on the upper side simultaneously while they are both in a wet state. As the prior art associated with these methods, JP-A-53-92,110 discloses a method of production which resorts to application of a magnetic field to the two-layer film and JP-A-62-212,933 discloses a method for the production of a magnetic recording medium which comprises simultaneously applying at least two magnetic layers in a superposed manner and applying a magnetic field on the two layers before they are dried a thereby effecting orientation of the magnetic powder in the magnetic layers. Then, JP-B-05-59,490 proposes a method for the production of a magnetic recording medium which comprises forming a magnetic layer and a nonmagnetic undercoat layer simultaneously by the superposing coating technique and applying a magnetic field on the two layers before they are dried thereby orienting the magnetic powder in the magnetic layer. Further, JP-A-05-81,667 discloses a method for the production of a magnetic recording medium which comprises applying in a superposed manner a paint for first application and a paint for last application, both having magnetic particles of pure iron or a metal alloy dispersed therein, by the use of a first coating nozzle and a last coating nozzle so as to have the paints to be deposited either separately or integrally in a wet state and thereafter performing a treatment for smoothing the surface on the applied layers. Then, JP-A-07-176,047 proposes a method for the production of a magnetic recording medium which comprises a step of either simultaneously applying two magnetic layers one each to the opposite surfaces of a support or applying a magnetic layer to one surface of the support and then applying another magnetic layer to the remaining surface before the first magnetic layer dries. This method is aimed at equalizing the properties of the magnetic layers on the two sides of the support.

In the application of a magnetic layer to a substrate, when the magnetic layer is formed in a decreased thickness, the freshly applied magnetic layer dries quickly (the solvent therein readily vaporizes) because of the small thickness of the layer and, in spite of the adoption of any of the coating methods proposed as described above, the subsequent treatment for the orientation of a magnetic field is liable to fail to improve so much the degree of orientation of the magnetic powder in the applied coat as is expected. When the freshly applied magnetic layer dries at an extremely high speed, the paths through which the solvent vaporizes from the layer leave behind a porous surface to the layer, with the possible discouraging result that the intended impartation of a higher degree of packing and enhanced durability to the magnetic layer will not be fulfilled. Further, the task of efficiently forming the backcoat layer remains yet to be fulfilled. Absolutely no technical disclosure concerning the efficient formation of the backcoat layer is found anywhere in the patent publications cited above.

This invention has been created in the light of the true state of prior art mentioned above. An object of this invention is to allow formation of a magnetic layer excelling in the degree of orientation in spite of a decrease in thickness, ensures impartation of a high degree of packing and enhanced durability to the magnetic film of a small thickness, and permits efficient formation of a backcoat layer which used to impose a heavy load on the conventional process of manufacture. Another object of this invention is to exalt the surface quality of the magnetic layer by improving the operational efficiency of the calendering step and consequently decrease the loss of the applied layer of the paint which used to occur during the course of the calendering step in the conventional separate line.

SUMMARY OF THE INVENTION

The present inventors, after a diligent study continued in search of a solution of the task mentioned above, have come to notice that, in the method for the production of a magnetic recording medium provided with one or more magnetic layers, the drying speed of the applied magnetic coating increases, the efficiency of orientation of the magnetic powder in the applied magnetic coating by a magnetic field declines, and the surface quality of the applied magnetic coating (layer) degrades in proportion as the thickness of the applied magnetic coating decreases particularly to 3.0 $\mu$m or less. They have learned, however, that in the provision of a magnetic coating having a small thickness of not exceeding 3.0 $\mu$m, the degree of orientation of the magnetic powder can be markedly improved and, moreover, the impartation of a high degree of packing and improved durability to the magnetic layer can be attained by ensuring the presence of a backcoat layer in an infallibly undried state (particularly in a wet state) while the magnetic coating is remaining in an undried state, particularly in a wet state and applying a magnetic field on the magnetic coating kept in a wet state, namely in an undried state, thereby effecting orientation of the magnetic field. This knowledge has led to the creation of the present invention. They have further learned that the surface quality of the magnetic recording medium can be greatly improved and the loss of the applied layer of the paint can be decreased by drying the applied coating after the treatment for orientation and carrying out the calendering step on the in-line system. This knowledge has led to the conception of this invention. Specifically, this invention is directed to a method for the production of a magnetic recording medium provided on one surface of a nonmagnetic support thereof with a magnetic layer and on the other surface of the nonmagnetic support with a backcoat layer, comprising a step of applying a magnetic paint for the formation of the magnetic layer to one surface of the nonmagnetic support, a step of applying a paint for the formation of the backcoat layer to the other surface of the nonmagnetic support, and a step of applying a magnetic field thereby effecting an orienting treatment after the magnetic paint for the formation of the magnetic layer and the paint for the formation of the backcoat layer have been applied and before the magnetic paint for the formation of the magnetic layer has dried, which method is so adapted that the magnetic paint for the formation of the magnetic layer and the paint for the formation of the backcoat layer both retain an undried state after they have been both applied to the nonmagnetic support.

This invention is further directed to a method for the production of a magnetic recording medium provided on one surface of a nonmagnetic support thereof with a lower magnetic layer, on the lower magnetic layer with an upper magnetic layer, and on the other surface of the nonmagnetic support with a backcoat layer, comprising a step of applying a magnetic paint for the formation of the lower magnetic layer to one surface of the nonmagnetic support, a step of applying a magnetic paint for the formation of the upper magnetic layer to the layer of the magnetic paint for the formation of the lower magnetic layer applied to the nonmagnetic support, a step of applying a paint for the formation of the backcoat layer to the other surface of the nonmagnetic support, and a step of applying a magnetic field thereby effecting an orienting treatment after the magnetic paint for the formation of the lower magnetic layer, the magnetic paint for the formation of the upper magnetic layer, and the paint for the formation of the backcoat layer have been applied and before the magnetic paint for the formation of the upper magnetic layer has dried, which method is adapted so that the magnetic paint for the formation of the upper magnetic layer and the paint for the formation of the backcoat layer retain an undried state after they have been both applied to the nonmagnetic support.

This invention is also directed to a method for the production of a magnetic recording medium provided on one surface of a nonmagnetic support thereof with a nonferromagnetic undercoat layer, on the undercoat layer with an upper magnetic layer, and on the other surface of the nonmagnetic support with a backcoat layer, comprising a step of applying a paint for the formation of the nonferromagnetic undercoat layer to one surface of the nonmagnetic support, a step of applying a magnetic paint for the formation of the upper magnetic layer to the layer of the paint for the formation of the nonferromagnetic undercoat layer applied to the nonmagnetic support, a step of applying a paint for the formation of the backcoat layer to the other surface of the nonmagnetic support, and a step of applying a magnetic field thereby effecting an orienting treatment after the paint for the formation of the nonferromagnetic undercoat layer, the magnetic paint for the formation of the upper magnetic layer, and the paint for the formation of the backcoat layer have been applied and before the magnetic paint for the formation of the upper magnetic layer has dried, which method is so adapted that the magnetic paint for the formation of the upper magnetic layer and the paint for the formation of the backcoat layer retain an undried state after they have been both applied to the nonmagnetic support.

Further, this invention further comprises a step of drying the coating and then calendering the dried coating on the in-line system after the step of orienting treatment.

This invention, as described above, can markedly improve the degree of orientation of the magnetic powder and, moreover, impart a high degree of packing and improved durability to the magnetic layer by ensuring the presence of a backcoat layer in an infallibly undried state (particularly in a wet state) while the magnetic coating is remaining in an undried state, particularly in a wet state, and applying a magnetic field on the magnetic coating kept in a wet state, namely in an undried state, thereby effecting an orienting treatment. Further, this invention can greatly improve the surface quality of the magnetic layer of the magnetic recording medium, lower the loss of the applied layer of the paint, and permit a generous cut in the fixed cost the coating line because it causes the coating to be dried after the orienting treatment and the calendering work to be performed on the in-line system.

DETAILED DESCRIPTION OF THE INVENTION

Figure 1:
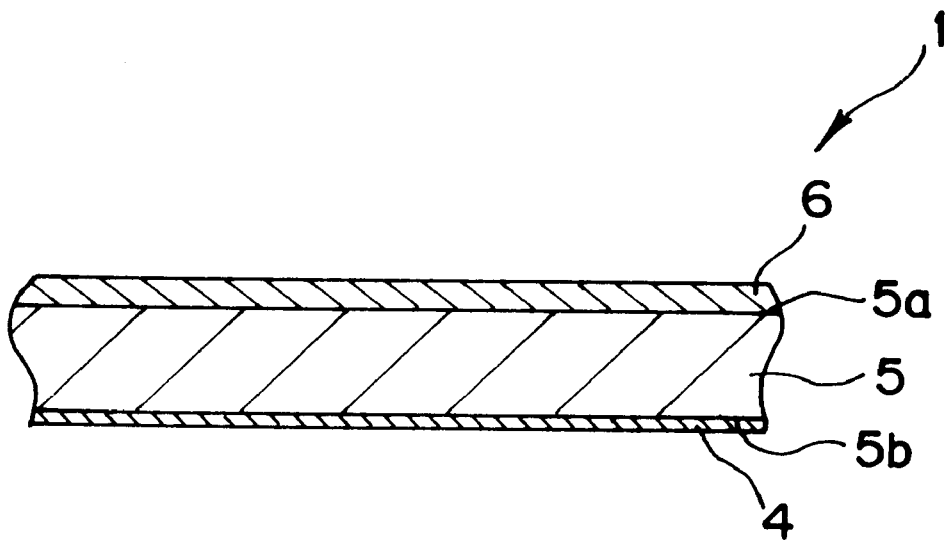
FIG. 1 is a cross section schematically illustrating one example of the magnetic recording medium to which the method of production of this invention is directed.
Figure 4:
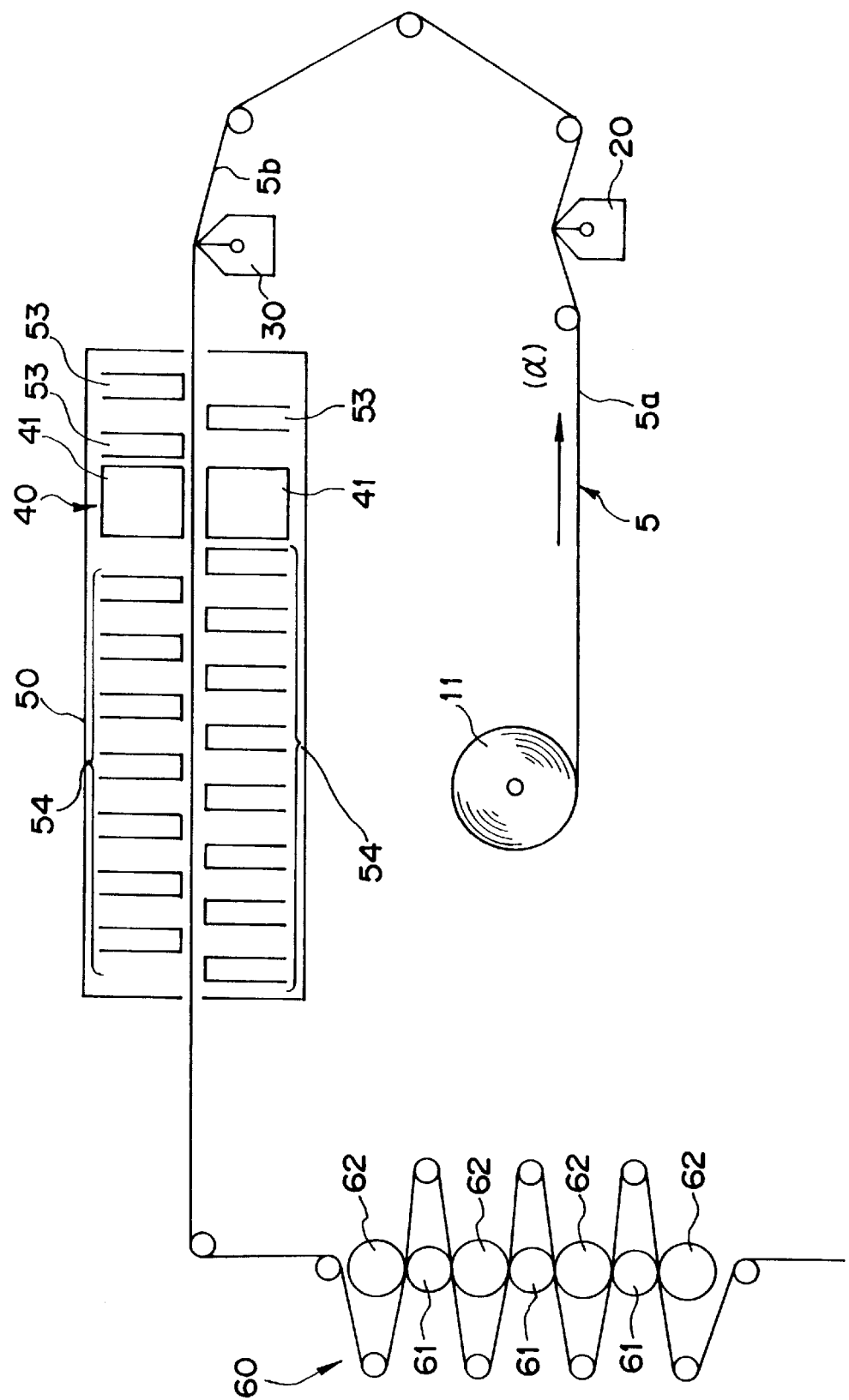
FIG. 4 is a process flow diagram schematically illustrating one example of the method of production according to this invention.

Now, the mode of implementing this invention will be described in detail below. First, a method for the production of a magnetic recording medium in the simplest form, i.e. a magnetic recording medium 1 which, as illustrated in FIG. 1, is provided on one surface 5a of a nonmagnetic support 5 with a magnetic layer 6 and on the other surface 5b of the nonmagnetic support 5 with a backcoat layer 4. FIG. 4 is a schematic production process diagram depicting a method for the production of this magnetic recording medium 1.

In the apparatus illustrated in FIG. 4, an unwinding device which is provided with an unwinding roll 11 having a nonmagnetic support 5 wound thereon is positioned on the most upstream side. As principal components of the apparatus, a device for applying a magnetic paint (such as, for example, an extrusion nozzle 20), a device for applying a paint for the formation of a backcoat layer (such as, for example, an extrusion nozzle 30), a magnetic field orienting device 40, a drying device 50, a calendering device 60, and a rewinding device (not shown) are sequentially laid out toward the downstream side from the unwinding roll 11.

The method of production according to this invention starts applying the magnetic paint for the formation of the magnetic layer by the use of the coating device (such as, for example, the extrusion nozzle 20) to the one surface 5a of the nonmagnetic support 5 continuously running (along the direction of an arrow ($\alpha$)).

Generally, the surface of the nonmagnetic support 5 prior to the application thereto of the paint is often treated, for the purpose of cleaning and surface control, by a varying known contrivance such as wet cleaning by the use of water or a solvent, dry cleaning by the use of a wiper of non-woven fabric or woven fabric of microfine fibers, or non-contact type cleaning by the use of compressed air, vacuum, or ionized air. Further, the surface of the nonmagnetic support 5 is often subjected, for the purpose of ensuring fast adhesion of the paint to the nonmagnetic support 5 and improving the quality of surface for application, to a varying known non-contact surface treatment such as corona discharge, ultraviolet light irradiation, or electron beam irradiation. Occasionally, the surface is undercoated with a water type undercoating agent, an emulsion type undercoating agent, or a solvent type undercoating agent either alone or in combination with the surface treatment mentioned above for the purpose of enhancing the fast adhesion.

After this application of the magnetic paint, generally as a subsequent step, the wet surface of the film of the magnetic paint deposited on the nonmagnetic support may be given a varying treatment for smoothing the surface or regulating the applied film. As the smoothing means, a film or a bar made of a resinous, metallic, or ceramic substance may be used for contact smoothing or a magnetic field with a permanent magnet or an electromagnet or vibration with ultrasonic wave for noncontact smoothing. These surface treatments may be used either singly or in combination, depending on the properties to be expected of the product.

After this application of the magnetic paint, a paint for the formation of the backcoat layer is immediately applied by the use of a coating device (such as, for example, the extrusion nozzle 30) to the other surface 5b of the nonmagnetic support 5 which is continuously running.

The method of coating according to this invention is implemented most advantageously by a procedure of applying the magnetic paint and the paint for the formation of the backcoat layer substantially simultaneously to the opposite surfaces of the nonmagnetic support 5 and drying the applied layers of the paints with one and the same drying means. As the coating devices for this purpose, the coating device disposed on the most upstream side may be a gravure coater, a reverse roll coater, or an extrusion nozzle and the coating device on the downstream side must be an extrusion nozzle. When the paints (the magnetic paint and the paint for the formation of the backcoat layer) are applied to the opposite surfaces of the nonmagnetic support perfectly at the same time, the two coating devices must be both an extrusion nozzle. Concerning this application of the paints to the opposite surfaces, the present patent applicant has already proposed the best method of application (JP-A-07-185,449 and JP-A-07-185,437).

Two orienting magnets 41 of the magnetic field orienting device are set applying a magnetic field to effect an orienting treatment (the step for the orienting treatment) after the application of the magnetic paint for the formation of the magnetic layer and the paint for the formation of the backcoat layer severally to the opposite surfaces of the nonmagnetic support 5 and before the magnetic paint for the formation of the magnetic layer has dried. In this invention, since the paint for the formation of the backcoat layer exists in an undried state on the reverse surface of the nonmagnetic support 5, the retention of "the magnetic paint for the formation of the magnetic layer in an undried state" can be easily attained even when the applied coating of the magnetic layer has a small thickness. In short, the essence of the method of production according to this invention consists in retaining the magnetic coating in a wet state and meanwhile applying a magnetic field on the magnetic coating in the undried state by ensuring the presence of a backcoat layer in an infallibly undried state (particularly in a wet state) while the magnetic coating is in the undried state (particularly in the wet state) (in other words, by causing the two paints to retain an undried state at the time that the application of these paints is completed). So long as the state essential for this invention is retained intact, the sequence in which the application of the magnetic paint for the formation of the magnetic layer and that of the paint for the formation of the backcoat layer may be changed as a modification of the method of production mentioned above. To be specific, the extrusion nozzle 20 may be actuated first to apply the paint for the formation of the backcoat layer and then the extrusion nozzle 30 may be actuated to apply the magnetic paint for the formation of the magnetic layer. What is important is the fact that the presence of the paint for the formation of the backcoat layer in an undried state should be relied on to maintain the magnetic coating in an undried state until the orienting treatment.

The orienting treatment may be performed, as illustrated in FIG. 4, on the magnetic coating by means of the orienting magnets 41 after the magnetic coating has been predried with hot air nozzles 53 prior to reaching the orienting magnets in the drying oven. The reference numeral 54 denotes each of a plurality of hot air nozzles laid out on the downstream side of the orienting magnets 41. The orienting magnets do not need to be limited to one pair as illustrated in the diagram but may be in a larger number and disposed at a plurality of steps inside the drying oven. The orienting treatment under discussion brings about the same effect when orienting magnets of a first stage (not shown) are disposed between the extrusion nozzle 30 and the entrance to the drying oven and orienting magnets of a last stage are disposed inside the drying furnace.

Further concerning the orienting treatment, this treatment is performed for the purpose of orienting the magnetic powder in the magnetic layer and this orientation may be made in a longitudinal, perpendicular, or oblique direction relative to the direction of running of the medium. This orientation is effected by the use of varying magnetic field-generating means such as a permanent magnet like a ferrite magnet or a rare earth magnet, an electromagnet, or a solenoid. Two or more species of these magnetic field-generating means may be used in combination. For the purpose of maximizing the degree of orientation after the magnetic coating has been dried, the wet magnetic coating may be subjected to a step of moderate drying prior to or simultaneously with the orienting treatment.

After this orienting treatment has been completed, the applied coatings are dried by the use of a drying device 50 (drying oven). The drying device 50 illustrated in FIG. 4 is adapted to dry the wet coatings with the hot air which is spouted through the hot air nozzles 53 and 54. The wet coatings may be otherwise dried and fixed by any of known drying and evaporating means such as an infrared ray emitter, an electric heater, or a vacuum device or any of various known curing devices such as an ultraviolet light lamp or a radiation emitter. The drying temperature may be suitably selected in the approximate range of room temperature—300° C., depending on such factors as the ability of the nonmagnetic support to withstand heat and the kind and concentration of the solvent. The interior of the drying oven may be adapted to produce a temperature gradient and the gaseous environment inside the drying oven may be formed of ordinary air or an inert gas. When an ultraviolet lamp or a radiation emitter is used for drying the wet coating, it possibly induces a curing reaction in the coating. In due consideration of the subsequent steps of the process, it is advantageous to use some other drying means so far as circumstances permit. When the coating still containing the solvent is exposed to the ultraviolet light or the radiation, it possibly catches fire or emits smoke. Again in this case, it is appropriate to use additionally some other drying means so far as circumstances permit.

The coatings (the magnetic layer and the backcoat layer) which have undergone the orienting treatment and the drying treatment mentioned above properly are subjected to an in-line calendering treatment by the use of the calendering device 60. When the magnetic recording medium already furnished with the magnetic layer and the backcoat layer is calendered on the in-line system, it acquires a conspicuous improvement in the surface processibility of the magnetic layer and consequently in such properties as electromagnetic conversion property. When the treatment is continuously carried out on the in-line system, the loss of the applied layer of the paint which used to occur because of the separation of the coating line and the calendering line in the conventional process.

The calendering device 60 for performing the calendering work is provided, as illustrated in FIG. 4, with a plurality of calendering rolls 61 and 62 which are arranged in a row. The nonmagnetic support having the magnetic layer and the backcoat layer already formed thereon is passed as pressed and heated between the calendering rolls. The calendering rolls 61 illustrated in FIG. 4 are disposed on the side for contact with the obverse surface of the magnetic layer and the calendering rolls 62 on the side for contact with the reverse surface of the nonmagnetic support (the side basing the backcoat layer). The calendering rolls 61 on the side for contact with the magnetic surface are generally metallic rolls and the calendering rolls 62 on the side for contact with the reverse surface of the nonmagnetic support may be either resinous rolls or metallic rolls. As the resinous rolls, such heat-resistant plastic rolls as are formed of epoxy, polyester, nylon, polyimide, or polyimideamide (which may incorporate therein carbon, metal, or some other inorganic compound) are used. These calendering rolls 61 and 62 are generally used as combined in three to seven steps (seven steps of rolls depicted in FIG. 4). Properly, the calendering temperature is not less than 70° C., preferably not less than 80° C. Though the upper limit of this temperature is variable with the kind of the support to be used, it is properly set at 150° C. The linear pressure with which the magnetic recording medium is nipped between the opposed rolls is appropriately not less than 200 kg/cm, preferably not less than 300 kg/cm. Though the speed of running of the nonmagnetic support through the interfaces of the opposed rolls depends on the speed of the coating device because of the in-line system, it is generally in the range of 20 m/minute–700 m/minute.

The magnetic recording medium, after undergoing the calendering treatment, is appropriately subjected to the thermal curing treatment at a temperature in the range of 40–80° C. and/or the treatment with an electron beam for the purpose of accelerating the curing of the magnetic layer and the backcoat layer.

Subsequently, the magnetic recording medium is given a prescribed shape of tape by the use of slitters and the magnetic surface and/or the backcoat surface is given such a secondary processing as polishing and cleaning, to complete a magnetic recording medium.

Figure 2:
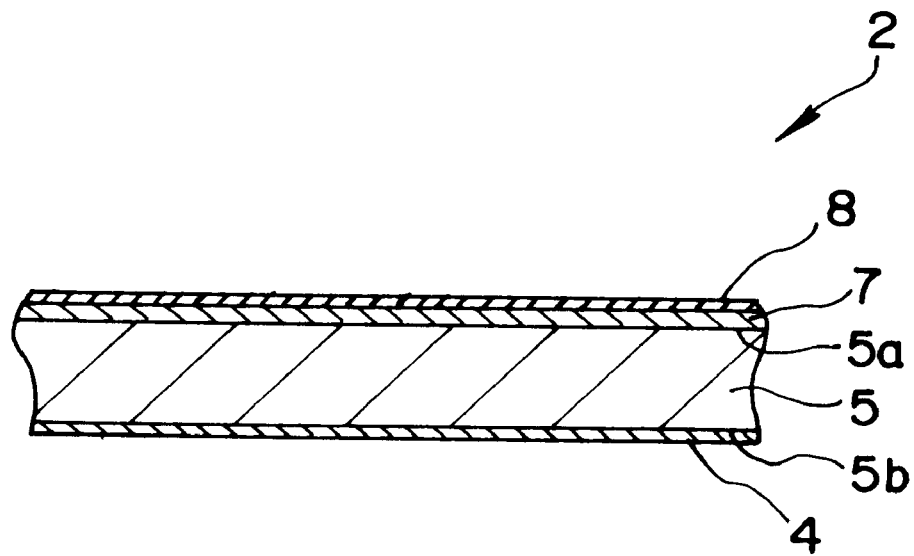
FIG. 2 is a cross section schematically illustrating another example of the magnetic recording medium to which the method of production of this invention is directed.

Now, another mode of implementing this invention will be described below. The magnetic recording medium to which this mode of the invention is directed is a magnetic recording medium 2 which, as illustrated in FIG. 2, is provided on one surface 5a of the nonmagnetic support 5 with a lower magnetic layer 7, on the lower. magnetic layer 7 with an upper magnetic layer 8, and on the other surface 5b of the nonmagnetic support 5 with a backcoat layer 4. In the production of the magnetic recording medium 2 of this construction, the essence of this invention regarding the production consists in retaining the magnetic coating of the upper magnetic layer 8 in a wet state and meanwhile applying a magnetic field on the magnetic coating in the undried state by ensuring the presence of a backcoat layer in an infallibly undried state (particularly in a wet state) while the magnetic coating of at least the upper magnetic layer 8 is in the undried state (particularly in the wet state). Of course, the orienting treatment is preferably embodied by applying a magnetic field on the magnetic coatings of the upper magnetic layer 8 and the lower magnetic layer 7 meanwhile keeping these magnetic coatings in a wet state by ensuring the presence of a backcoat layer in an infallibly undried state (particularly in a wet state) while the magnetic coatings of the upper magnetic layer 8 and the lower magnetic layer 7 are in the undried state (particularly in the wet state).

As concrete modes of applying the component coatings, the following procedures may be cited.

Figure 5A:
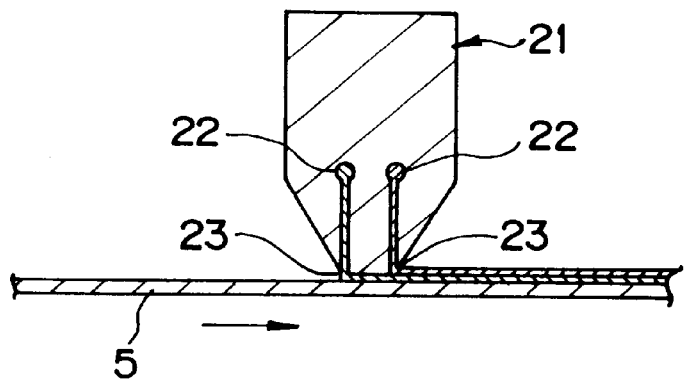
FIGS. 5A, B, and C are diagrams depicting the shapes and layouts of nozzles to be used for two-layer application of paints by the so-called wet-on-wet method.
Figure 5B:
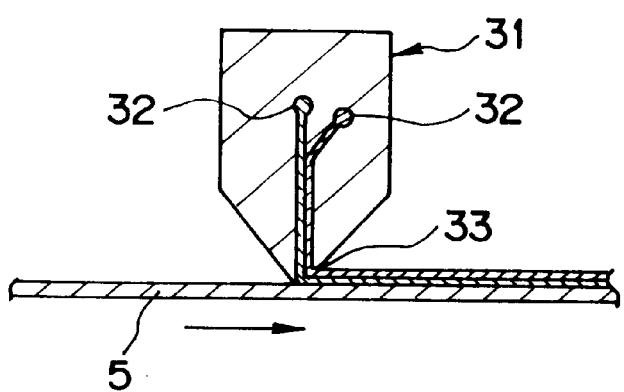

2-1) The procedure which comprises simultaneously applying the magnetic paint for the formation of the lower magnetic layer and the magnetic paint for the formation of the upper magnetic layer and subsequently applying the paint for the backcoat layer. (As means for simultaneous application, extrusion nozzles 21 and 31 capable of such a so-called wet-on-wet type application as illustrated in FIGS. 5A and B may be cited. The extrusion nozzle 21 of FIG. 5A is provided with two liquid reservoirs 22 and two discharge mouths 23 and the extrusion nozzle 31 of FIG. 5B is provided with two liquid reservoirs 32 and one discharge mouth 33. These constructions are both known to the art.)

Figure 5C:
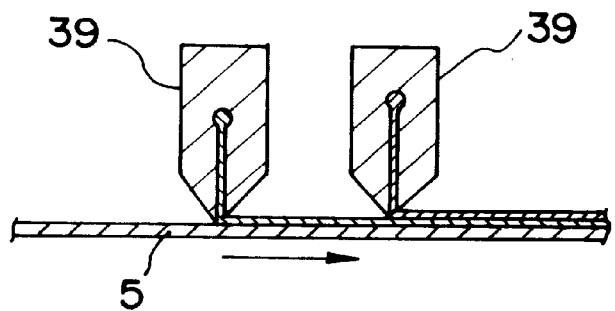

2-2) The procedure which comprises sequentially applying the magnetic paint for the formation of the lower magnetic layer and the magnetic paint for the formation of the upper magnetic layer in the order mentioned and subsequently applying the paint for the backcoat layer. (As means for sequential application, two single-layer application grade extrusion nozzles 39 of FIG. 5C arranged in series may be cited. They operate to effect the known wet- on-wet application.)

2-3) The procedure which comprises sequentially applying the magnetic paint for the formation of the lower magnetic layer, the paint for the formation of the backcoat layer, and the magnetic paint for the formation of the upper magnetic layer in the order mentioned.

2-4) The procedure which comprises applying the paint for the formation of the backcoat layer and subsequently applying simultaneously the magnetic paint for the formation of the lower magnetic layer and the magnetic paint for the upper magnetic layer.

2-5) The procedure which comprises applying the paint for the formation of the backcoat layer and subsequently applying sequentially the magnetic paint for the formation of the lower magnetic layer and the magnetic paint for the upper magnetic layer in the order mentioned.

After one of these procedures has been completed, the orienting treatment, the drying treatment, and the calendering treatment are carried out.

Invariably in the case of the procedures 2-1)–2-5) cited above, the backcoat layer exists in an infallible undried state (particularly in a wet state) while the magnetic coatings of the upper magnetic layer 8 and the lower magnetic layer 7 are severally in an undried state (particularly in a wet state).

As other concrete modes of applying the component coatings, the following procedures which invariably make use of the magnetic coating of the lower magnetic layer 7 deposited on the nonmagnetic support and dried in advance may be cited.

2-6) The procedure which comprises applying the magnetic paint for the formation of the upper magnetic layer to the dried lower magnetic layer 7 and subsequently applying the paint for the formation of the backcoat layer.

2-7) The procedure which comprises applying the paint for the formation of the backcoat layer to the surface 5b opposite the surface of the dried lower magnetic layer 7 and subsequently applying the magnetic paint for the formation of the upper magnetic layer to the lower magnetic layer 7.

After either of these procedures has been completed, the orienting treatment, the drying treatment, and the calendering treatment are carried out.

Invariably in the case of the procedures 2-6) and 2-7) cited above, the backcoat layer exists in an infallible undried state (particularly in a wet state) while the magnetic coating of the upper magnetic layer 8 is in an undried state (particularly in a wet state).

Figure 3:
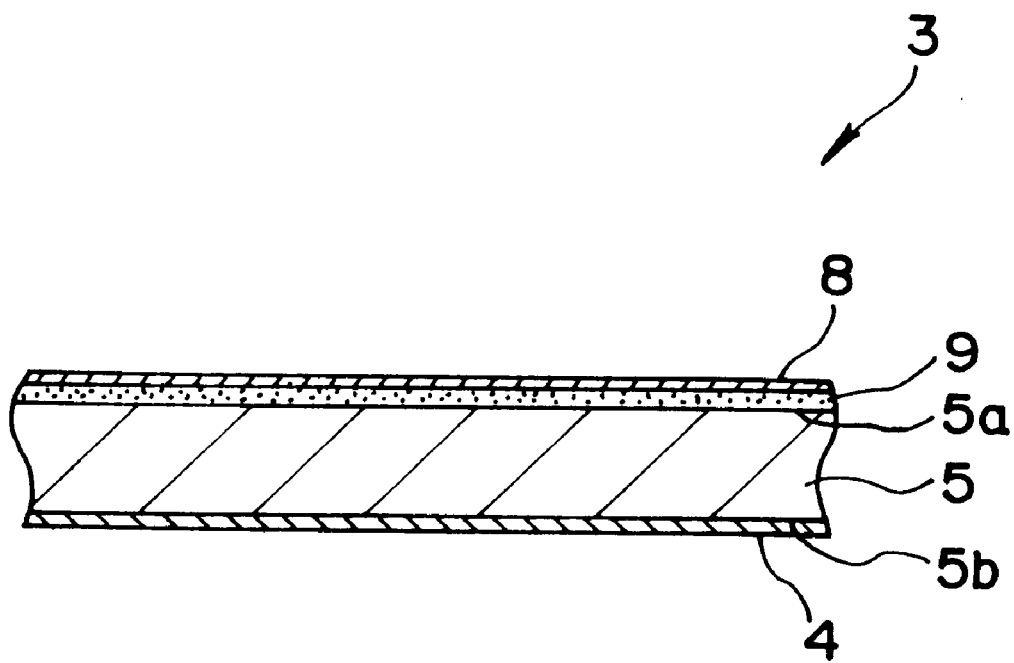
FIG. 3 is a cross section schematically illustrating still another example of the magnetic recording medium to which the method of production of this invention is directed.

Now, still another mode of implementing this invention will be described below. The magnetic recording medium to which this mode of the invention is directed is a magnetic recording medium 3 which, as illustrated in FIG. 3, is provided on one surface 5a of the nonmagnetic support 5 with a nonferromagnetic undercoat layer 9, on the nonferromagentic undercoat layer 9 with an upper magnetic layer 8, and on the other surface 5b of the nonmagnetic support 5 with a backcoat layer 4. In the production of the magnetic recording medium 3 of this construction, the essence of this invention regarding the production consists in retaining the magnetic coating of the upper magnetic layer 8 in a wet state and meanwhile applying a magnetic field on the magnetic coating in the undried state by ensuring the presence of a backcoat layer in an infallibly undried state (particularly in a wet state) while the magnetic coating of at least the upper magnetic layer 8 is in the undried state (particularly in the wet state). Of course, the orienting treatment is alternatively embodied by applying a magnetic field on the coatings of the upper magnetic layer 8 and the nonferromagnetic undercoat layer 9 meanwhile keeping these coatings in a wet state by ensuring the presence of a backcoat layer in an infallibly undried state (particularly in a wet state) while the coatings of the upper magnetic layer 8 and the nonferromagnetic undercoat layer 9 are in the undried state (particularly in the wet state).

As concrete modes of applying these component coatings, the following procedures may be cited.

3-1) The procedure which comprises simultaneously applying the paint for the formation of the nonferromagnetic undercoat layer and the magnetic paint for the formation of the upper magnetic layer and subsequently applying the paint for the formation of the backcoat layer.

3-2) The procedure which comprises sequentially applying the paint for the formation of the nonferromagnetic undercoat layer and the magnetic paint for the formation of the upper magnetic layer in the order mentioned and subsequently applying the paint for the formation of the backcoat layer.

3-3) The procedure which comprises sequentially applying the paint for the formation of the nonferromagnetic undercoat layer, the paint for the formation of the backcoat layer, and the magnetic paint for the formation of the upper magnetic layer in the order mentioned.

3-4) The procedure which comprises applying the paint for the formation of the backcoat layer and subsequently applying simultaneously the paint for the formation of the nonferromagnetic undercoat layer and the magnetic paint for the formation of the upper magnetic layer.

3-5) The procedure which comprises applying the paint for the formation of the backcoat layer and subsequently applying sequentially the paint for the formation of the nonferromagnetic undercoat layer and the magnetic paint for the formation of the upper magnetic layer in the order mentioned.

After one of these procedures has been completed, the orienting treatment, the drying treatment, and the calendering treatment are carried out.

Invariably in the case of the procedures 3-1)–3-5) cited above, the backcoat layer exists in an infallible undried state (particularly in a wet state) while the coatings of the upper magnetic layer 8 and the nonferromagnetic undercoat layer 9 are an undried state (particularly in a wet state).

As other concrete modes of applying the component coatings, the following procedures which invariably make use of the coating of the nonferromagnetic undercoat layer 9 deposited on the nonmagnetic support and dried in advance may be cited.

3-6) The procedure which comprises applying the magnetic paint for the formation of the upper magnetic layer to the dried nonferromagnetic undercoat layer 9 and subsequently applying the paint for the formation of the backcoat layer.

3-7) The procedure which comprises applying the paint for the formation of the backcoat layer to the surface 5b opposite the surface of the dried nonferromagnetic undercoat layer 9 and subsequently applying the magnetic paint for the formation of the upper magnetic layer to the nonferromagnetic undercoat layer 9. After either of these procedures has been completed, the orienting treatment, the drying treatment, and the calendering treatment are carried out.

Invariably in the case of the procedures 3-6) and 3-7) cited above, the backcoat layer exists in an infallible undried state (particularly in a wet state) while the magnetic coating of the upper magnetic layer 8 is in an undried state (particularly in a wet state).

Now, the magnetic paint to be used in the method for the production of the magnetic recording medium of this invention will be described. The magnetic paint contains as principal components thereof a ferromagnetic powder, a binder, and a solvent.

As concrete examples of the ferromagnetic powder to be used herein, iron oxide type magnetic powders such as $\gamma$-$Fe_2O_3$ coated or doped with a Co compound, $Fe_3O_4$ coated or doped with a Co compound, and bertholides coated or doped with a Co compound; ferromagnetic iron or alloy powders having ferromagnetic metal elements like α-Fe, Fe—Co, Fe—Ni, Fe—Co, Ni, Co, and Co—Ni as a principal component thereof; $CrO_2$ magnetic powder; and plate hexagonal ferrite powder having an easy magnetizing axis in a direction perpendicular to the plate thereof may be cited.

Incidentally, the ferromagnetic powder may incorporate therein Al, Si, P, Y, or a rare earth element for the purpose of preventing the magnetic powder itself from being sintered, improving the particle size distribution thereof, and consequently enhancing the electromagnetic conversion property of the magnetic recording medium. When the surface of the ferromagnetic powder is coated with Al, Si, P, or an oxide thereof during the manufacture of the powder or the ferromagnetic powder, after being manufactured, is given a surface treatment with a coupling agent such as Si, Al, or Ti or a varying surfactant, the ferromagnetic paint is enabled to acquire improved dispersibility and the ultimately produced magnetic recording medium is enabled to acquire improved durability.

The binder to be contained in the magnetic paint may be any of the binder resins such as thermoplastic resins, reactive resins, and electron beam curing resins which are used generally for the formation of a magnetic layer in a magnetic recording medium. Appropriately, the thermoplastic resin has a softening point of 150° C. or less and an average molecular weight in the approximate range of 5000–200000. As concrete examples of the thermoplastic resin which answers this description, vinylchloride type copolymers, polyurethane resins, (meth)acrylic resins, polyester resins, nitrocellulose, and phenoxy type resins may be cited. Among other thermoplastic resins cited above, those reactive resins having a hydroxyl group at the terminal and/or in the side chain of a copolymer prove particularly advantageous because they are capable of easily utilizing the cross-linkage by the use of an isocyanate or the electron-beam cross-linkage due to an electron beam functional type modification. The average molecular weight and the polymerization degree thereof are on a part with those of the thermoplastic resin serving as a basis. When the reactive resin is heated and/or exposed to an electron beam after the magnetic paint has been applied to a substance, dried, and calendered, it undergoes such reactions as condensation and addition to a point where the molecular weight thereof will grow infinitely.

This binder resin appropriately incorporates therein through copolymerization or addition reaction at least one polar group, namely a hydrophilic functional group. This polar group is selected from the class consisting of —$SO_3M$, —$SO_4M$, =$PO_3M$, =$PO_2M$, =POM, —P=$O(OM)_2$, —OP=$O(OM)_2$, —COOM, —$NR_3X$, —$NR_2$, —$N^+R_3$, epoxy group, —OH, —SH, and —CN (wherein M is H, Li, Na, K, or —$NR_3$, R is an alkyl group or H, and X is a halogen atom). The incorporation of this polar group contributes to the improvement of the dispersibility of the paint and consequently to the improvement of the characteristic properties of the magnetic recording medium. The polar group may be present in the main chain or in the branch of the skeleton resin. Though these resins may be used singly, the use of a combination of two or more of these resins allows the various properties of the magnetic recording medium to be improved. Among other conceivable combinations of these resins, the combinations of such vinyl chloride type copolymers as shown below with polyurethane resin prove particularly appropriated.

The vinyl chloride type copolymer appropriately has a vinyl chloride content in the range of 60–95 wt %, preferably 60–90 wt % and an average polymerization degree in the approximate range of 100–500. The vinyl chloride type copolymer is obtained by copolymerizing such a copolymerizing monomer as vinyl chloride, vinyl acetate, vinyl alcohol capable of incorporating therein vinyl acetate through saponification, hydroxyalkyl (meth)-acrylate, maleic acid, glycidyl (meth)acrylate, and allyl glycidyl ether. Appropriately, the copolymer incorporates therein through copolymerization or addition reaction at least one polar group selected from the class of polar groups mentioned above. Among other polar groups cited above, the —$NR_2$ group proves particularly advantageous because it is capable of improving the physical properties (such as the stability of storage) of the paint when it is used in combination with a polar group originating in the acid mentioned above.

The term "polyurethane resin" is a general term which is applied to such resins as are produced by the reaction of such hydroxyl group-containing resins as polyester polyols and/or polyether polyols with a polyisocyanate-containing compound. It is obtained by polymerizing such raw materials for synthesis as mentioned above until a number-average molecular weight in the approximate range of 5000–200000. It must possess a 0 value (weight average molecular weight/number average molecular weight) that falls in the approximate range of 1.5–4. Appropriately, at least two urethane resins are used which, in the binder to be used, manifest different glass transition points, Tg, in the range of $-30°$ C.$\leq Tg \leq 80°$ C. and the total amount of the urethane resins is in the range of 10–90 wt % of the total amount of the binder. The inclusion of the plurality of polyurethane resins permits the running stability of the medium and the calender processibility and the electromagnetic conversion property at elevated temperatures to be balanced. Appropriately, the polyurethane resin (at least one when two or more species are used) incorporates therein the polar group mentioned above.

The vinyl chloride type copolymer and the polyurethane resin are appropriately used at a gravimetric mixing ratio in the range of 10:90–90:10.

The cross-linking agent which is used for hardening the binder resin may be any of various known polyisocyanates. This cross-linking agent three-dimensionally binds the hydroxyl groups contained in the binder resin and consequently enables the produced coating to be improved in durability. The copolymer mentioned above may have the sensitivity thereof to electron beam modified by incorporating therein a (meth)acrylic type double bond by a known technique.

The solvent to be contained in the magnetic paint is not particularly limited. It is selected in consideration of the solubility, compatibility, drying efficiency, etc. of the binder to be used. As concrete examples of the solvent which is advantageously used herein, ketones such as methylethyl ketone, methyl isobutyl ketone, and cyclohexanone; aromatic hydrocarbons such as toluene and xylene; esters such as ethyl acetate and butyl acetate; alcohols such as isopropanol and butanol; and chlorine-substituted hydrocarbons such as dioxane, tetrahydro-furan, dimethyl formamide, and hexane may be cited. These diluents or solvents may be used either singly or in the form of a mixture of two or more members combined at an arbitrary ratio.

The magnetic paint generally contains a lubricant. Among the various known lubricants, fatty acids and/or fatty acid esters prove particularly advantageous. As concrete examples of the fatty acid used effectively herein, monobasic fatty acids having 12–24 carbon atoms may be cited. As concrete examples of the fatty acid ester used herein, monofatty acid esters, difatty acid esters, and trifatty acid esters which use as raw materials thereof a monobasic fatty acid of 10–24 carbon atoms and one alcohol selected from the group consisting of univalent to hexavalent alcohols of 2–22 carbon atoms and cyclic or polysaccharide-reduced alcohols may be cited. The hydrocarbon groups in the fatty acids and fatty acid esters may contain an unsaturated bond or may be branched. Two or more of these lubricants may be used in combination. Besides the magnetic layers, the backcoat layer and the undercoat layer properly contain the lubricant. Particularly when the magnetic layers have small thicknesses, the incorporation of the lubricant in the undercoat layer is effective in improving the still durability of the produced magnetic recording medium. Further, when the lubricant content is increased on the backcoat layer side, the lubricant transferred to the surfaces of the magnetic layers can contribute to the improvement of the surface lubricity of the magnetic layers.

Generally, the magnetic paint contains additives which are intended to manifest a lubricating effect, an antistatic effect, a dispersing effect, and a plasticizing effect. The additives which are usable for this purpose include silicon oils, fluorine oils, cationic surfactants, nonionic surfactants, anionic surfactants, and amphoteric surfactants, for example.

The magnetic paint further contains inorganic compounds, particularly abrasive and nonferromagnetic pigment. As concrete examples of the pigment which is usable herein, α-alumina, γ-alumina, θ-alumina, dichromium trioxide, α-iron oxide, $SiO_2$, ZnO, $TiO_2$, silicon carbide, calcium carbonate, and barium sulfate may be cited. Though the shape, size, etc. of the particles of the pigment may be arbitrarily set, the particles properly have a spherical shape or a polyhedral shape. The particles appropriately have diameters in the range of 0.01–0.7 μm and, when necessary, may be suitably selected, depending on the balance between the durability expected of the medium and the abrasion of the head and the output at the shortest recording wavelength. The pigments cited above may be used either singly or in the form of a mixture of two or more members.

The magnetic paint may contain carbon black. As concrete examples of the carbon black which is effectively used herein, furnace carbon black, thermal carbon black, and acetylene black may be cited. These species of carbon black may be used either singly or in the form of a mixture of two or more members. The carbon black may be given a surface treatment with a lubricant or a dispersant or may have part of the surface thereof grafted before it is put to use herein. Though the particle size of the carbon black may be arbitrarily set, it is appropriately selected, depending on the balance among the electric resistance, friction properties, and the output (surface roughness) at the shortest recording wavelength expected of the medium.

The magnetic paint may contain a nonmagnetic organic powder (organic pigment). As concrete examples of the nonmagnetic organic powder to be used herein, acryl-styrene type resin powder, benzoguanamine resin powder, melamine type resin powder, phthalocyanine type pigment, polyolefin type resin powder, polyester type resin powder, polyamide type resin powder, polyimide type resin powder, fluo-hydrocarbon resin powder, and divinyl benzene type resin powder may be cited.

The solids concentration in the magnetic paint is appropriately set at a level in the range of 5–45% by weight, preferably 10–40% by weight. If this concentration is less than 5% by weight, the magnetic paint will no longer be able to produce a uniform coating. Conversely, if this concentration exceeds 45% by weight, the wet coating of the magnetic layer will dry so quickly that the improvement of the degree of orientation of the magnetic layer aimed at by this invention will not be easily attained. Particularly in the case of the upper magnetic layer, when the coating of the undercoat layer is in a dried state as in the procedures of (2-6), (2-7), (3-6), and (3-7) mentioned above, the trend indicated above grows conspicuous because the solvent in the coating of the magnetic layer migrates to the undercoat layer As concrete examples of the material for the nonmagnetic support to which the magnetic paint is applied, the films of polyethylene terephthalate (PET), polyethylene naphthalate (PEN), polyamide, polyimide, and polyamideimide may be cited. Among the materials cited above, PET, PEN, and aromatic polyamide prove particularly favorable. A composite film produced by coextruding two or three species of PET or PEN proves especially favorable. The nonmagnetic support may be subjected preparatorily to a corona discharge treatment, a plasma discharge and/or polymerization treatment, a treatment for application of adhesive agent, a dust proofing treatment, and a moderating treatment with heat and/or by adjustment of moisture.

In this invention, the paint for the formation of the backcoat layer 4 is applied to the surface of the nonmagnetic support opposite the surface thereof to which the magnetic paint is applied. The paint for the formation of the backcoat layer contains carbon black or an inorganic compound, a binder, and a solvent as main components thereof. These main components may be suitably selected from among the carbon blacks or inorganic compounds, binders, and solvents cited above by way of illustration in the passage concerning the magnetic paints, so as to meet the properties demanded. The paint may contain a lubricant and varying additives which are to be suitably selected from among the concrete examples cited above by way of illustration in the passage concerning the magnetic paints.

The solids concentration in the paint for the formation of the backcoat layer 4 is appropriately set at a level in the range of 8–30% by weight, preferably 10–25% by weight. If this concentration is less than 8% by weight, the paint will no longer be capable of forming a uniform coating. Conversely if this concentration exceeds 30% by weight, the wet coating of the magnetic layer will dry so quickly that the improvement of the degree of orientation of the magnetic layer aimed at by this invention will not be easily attained.

For the paint for the formation of the nonferromagnetic undercoat layer which is used for forming the nonferromagnetic undercoat layer 9, the components may be suitably selected from among the binders, solvents, lubricants, carbon blacks, inorganic compounds, and various additives cited above by way of illustration in the passage concerning the magnetic paints.

The solids concentration in the paint for the formation of the nonferromagnetic undercoat layer 9 is properly in the range of 5–45% by weight, preferably 10–40% by weight. If this concentration is unduly low or unduly high, the paint will produce a uniform coating only with difficulty.

The process for producing the magnetic paints (for the upper and the lower layers) and that for producing the paints for the formation of the magnetic recording medium (the paint for the formation of the backcoat layer and the paint for the formation of the nonferromagnetic undercoat layer)

which are used in the method for the production of the magnetic recording medium of this invention each comprise at least ① a kneading step, ② a dispersing step, ③ a filtering step, ④ a mixing step which is optionally placed before or after any of the steps mentioned above, and ⑤ a storing step.

At the kneading step, the pigment powder and the whole or part of the binder are kneaded by the use of a kneading device of strong kneading force such as, for example, a continuous kneader, a pressure kneader, a high-speed mixer, or a two roll mill. At the dispersing step, the paint is dispersed by the use of zirconia or glass beads. At this dispersing step, the operation of dispersion is carried out in combination with an operation of dilution which is intended to effect gradual decrease of the solids concentration. The component steps may be severally divided into two or more stages. The raw materials may be added, as divided, at two or more of the component steps.

Appropriately the step of filtering the paint is placed after each of the processes of production mentioned above. If the magnetic paint entrains an undispersed portion or an agglomerated portion of the magnetic powder or resinous insolubles, it will entail the disadvantage of aggravating dropout and heightening the error rate. The filtering step is aimed primarily at deriving the magnetic paint of an extraneous substance.

The magnetic recording medium which is formed by the method of production according to this invention is provided, as described above, with one or a plurality (preferably two) magnetic layers. In the magnetic recording medium provided with one magnetic layer, the thickness of this magnetic layer is generally 3.0 μm or less, especially 0.1–3.0 μm, preferably 2.5 μm or less, especially 0.3–2.5 μm. If the thickness exceeds 3.0 μm, the drying speed of the coating of the magnetic layer will be lowered and the degree of orientation of the magnetic layer will not be increased in spite of the orienting treatment. Then, the self-demagnetization loss will increase when the recording wavelength is short. In the magnetic recording medium provided with a plurality of magnetic layers, the thickness of the uppermost magnetic layer is generally 1.0 μm or less, especially 0.05–1.0 μm, preferably 0.6 μm or less, especially 0.1–0.6 μm. If this thickness exceeds 1.0 μm, the provision of the lower layer will become meaningless as compared with the magnetic layer which is provided solely.

The thickness of the backcoat layer is set at a level in the range of 0.1–2.0 μm. If this thickness is less than 0.1 μm, the wet coating of the backcoat layer will dry so quickly that the improvement of the degree of orientation of the magnetic layer aimed at by this invention will not be easily attained. Then, the backcoat layer will be readily scraped while the medium is running. If this thickness exceeds 2.0 μm, the medium will produce increased friction with the path on which the medium slides, the running stability of the medium will be impaired, and the wet coating of the magnetic layer will dry so slowly as to give rise to the possibility of rather degrading than improving the orientation of the magnetic layer.

The thickness of the nonferromagnetic undercoat layer is set at a level in the range of 0.1–3.0 μm. If this thickness is less than 0.1 μm, the nonferromagnetic undercoat layer will be susceptible of the influence of the surface quality of the nonmagnetic support and consequently the surface coarseness of the nonferromagnetic layer will be degraded and the surface coarseness of the uppermost magnetic layer will be likewise degraded. As a result, the electromagnetic conversion property will tend to decline. If the thickness of the nonferromagnetic undercoat layer is increased beyond 3.0 μm, the excess will bring about no noticeable improvement of the quality of the layer. Then, the absorption of the solvent from the magnetic layer will grow to a point where the effect of this invention will be no longer attained.

The thickness of the lower magnetic layer is set at a level in the range of 0.1–3.0 μm. If this thickness is less than 0.1 μm, the lower magnetic layer will be susceptible of the influence of the surface quality of the nonmagnetic support and consequently the surface coarseness of the nonferromagnetic layer will be degraded and the surface coarseness of the uppermost magnetic layer will be likewise degraded. As a result, the electromagnetic conversion property will tend to decline. If the thickness of the lower magnetic layer is increased beyond 3.0 μm, the excess will bring about no noticeable improvement of the quality of the layer. Then, the absorption of the solvent from the magnetic layer will grow to a point where the effect of this invention will not be easily attained.

In the construction of this invention which resides in providing the backcoat layer while the magnetic layer is in an undried state or providing the magnetic layer while the backcoat layer is in an undried state, the thickness and the solids concentration in each of the layers are closely related. When the magnetic layer has a thickness of 1 μm or less, the backcoat layer appropriately has a thickness of not less than ½ of the thickness of the magnetic layer. As respects the solids concentration, when the thickness of the magnetic layer is 1 μm or less, the backcoat layer appropriately has a solids concentration not more than that of at least the magnetic layer.

Now, this invention will be described more specifically below with reference to working examples of the invention. A magnetic paint I, a magnetic paint II, a paint for the formation of a nonferromagnetic undercoat layer, and a paint for the formation of a backcoat layer were manufactured as follows.

Production of Magnetic Paint I

[Preparation of Binder Solution]

The following components were thrown in an agitator and stirred therein for six hours to form a binder solution. This binder solution was subjected to 8 hours' circulating filtration by the use of a depth type filter having a 95% cut filtration accuracy of 5.0 μm to prepare a finished binder solution.

| | |
|---|---|
| Vinyl chloride type resin (produced by Nippon Zeon K. K. and marketed under product code of "MR-110") | 10 parts by weight |
| Polyester polyurethane resin (containing —$SO_3Na$ group, $Mn$ = 25000, $Tg$ = 20° C.) | 5 parts by weight |
| Polyester polyurethane resin (containing —$SO_3Na$ group, $Mn$ = 25000, $Tg$ = −25° C.) | 2 parts by weight |
| MEK (methyl ethyl ketone) | 21 parts by weight |
| Toluene | 21 parts by weight |
| Cyclohexanone | 21 parts by weight |

[Kneading and Dispersing Treatment]

The following components were thrown into a pressure kneader and kneaded therein for two hours.

| | |
|---|---|
| Co-coated γ-iron oxide magnetic powder (Hc = 800 Oe, σ$_s$ = 70 emu/g, specific surface area = 45 m$^2$/g) | 100 parts by weight |
| α-Al$_2$O$_3$ (produced by Sumitomo Chemical Co., Ltd. and marketed under product code of "HIT-50") | 5 parts by weight |
| Cr$_2$O$_3$ (produced by Nippon Kagaku Kogyo K.K. and marketed under product code of "U-1") | 5 parts by weight |
| Binder solution | 40 parts by weight |

The blend resulting from the kneading, after adding the following components, was adjusted to the optimum viscosity for the dispersing treatment.

| | |
|---|---|
| Binder solution | 40 parts by weight |
| MEK (methyl ethyl ketone) | 15 parts by weight |
| Toluene | 15 parts by weight |
| Cyclohexanone | 15 parts by weight |

The mixture resulting from the viscosity adjustment was dispersed by the use of a sand grinding mill.

[Viscosity Adjusting Step]

The following components were thrown into an agitator and stirred therein for one hour to form a viscosity adjusting liquid. The viscosity adjusting liquid was subjected to 8 hours' circulating filtration by the use of a depth type filter having a 95% cut filtration accuracy of 1.2 μm.

| | |
|---|---|
| Stearic acid | 0.5 part by weight |
| Myristic acid | 0.5 part by weight |
| Butyl stearate | 0.5 part by weight |
| MEK (methyl ethyl ketone) | 65 parts by weight |
| Toluene | 65 parts by weight |
| Cyclohexanone | 65 parts by weight |

The viscosity adjusting liquid resulting from the circulating filtration and the slurry from the dispersing treatment were mixed. The mixture was dispersed by the use of a sand grinding mill to adjust the viscosity of the paint to 50 cp and form the paint for a magnetic layer. This paint was subjected to 8 hours' circulating filtration by the use of a depth type filter having a 95% cut filtration accuracy of 1.2 μm. During the adjustment of viscosity, the viscosity was determined by the use of a viscometer (produced by Rheology K.K. and marketed under product code of "MR-300") at a liquid temperature of 20° C. at a shear rate of 3000 sec$^{-1}$.

[Final Step]

The paint 1 for the magnetic layer was obtained by adding 0.8 part by weight of an isocyanate compound (produced by Nippon Polyurethane Kogyo K.K. and marketed under trademark designation of "Coronate L") to 100 parts by weight of the paint resulting from the filtration and mixing them by stirring.

Production of Magnetic Paint II

[Preparation of Binder Solution]

The following components were thrown in an agitator and stirred therein for six hours to form a binder solution. This binder solution was subjected to 8 hours' circulating filtration by the use of a depth type filter having a 95% cut filtration accuracy of 5.0 μm to prepare a finished binder solution.

| | |
|---|---|
| Vinyl chloride type resin (produced by Nippon Zeon K. K. and marketed under product code of "MR-110") | 10 parts by weight |
| Polyester polyurethane resin (containing —SO$_3$Na group, Mn = 25000, Tg = 20° C.) | 5 parts by weight |
| Polyester polyurethane resin (containing —SO$_3$Na group, Mn = 25000, Tg = −25° C.) | 2 parts by weight |
| MEK (methyl ethyl ketone) | 21 parts by weight |
| Toluene | 21 parts by weight |
| Cyclohexanone | 21 parts by weight |

[Kneading and Dispersing Treatment]

The following components were thrown into a pressure kneader and kneaded therein for two hours.

| | |
|---|---|
| α-Fe magnetic powder (Hc = 1650 Oe, σ$_s$ = 126 emu/g, specific surface area = 60 m$^2$/g, major axis = 0.10 μm) | 100 parts by weight |
| α-Al$_2$O$_3$ (produced by Sumitomo Chemical Co., Ltd. and marketed under product code of "HIT-80") | 10 parts by weight |
| Binder solution | 40 parts by weight |

The blend resulting from the kneading, after adding the following components, was adjusted to the optimum viscosity for the dispersing treatment.

| | |
|---|---|
| Binder solution | 40 parts by weight |
| MEK (methyl ethyl ketone) | 15 parts by weight |
| Toluene | 15 parts by weight |
| Cyclohexanone | 15 parts by weight |

The mixture resulting from the viscosity adjustment was dispersed by the use of a sand grinding mill.

[Viscosity Adjusting Step]

The following components were thrown into an agitator and stirred therein for one hour to form a viscosity adjusting liquid. The viscosity adjusting liquid was subjected to 8 hours' circulating filtration by the use of a depth type filter having a 95% cut filtration accuracy of 1.2 μm.

| | |
|---|---|
| Stearic acid | 0.5 part by weight |
| Myristic acid | 0.5 part by weight |
| Butyl stearate | 0.5 part by weight |
| MEK (methyl ethyl ketone) | 65 parts by weight |
| Toluene | 65 parts by weight |
| Cyclohexanone | 65 parts by weight |

The viscosity adjusting liquid resulting from the circulating filtration and the slurry from the dispersing treatment were mixed. The mixture was dispersed by the use of a sand grinding mill to adjust the viscosity of the paint to 40 cp and form the paint for a magnetic layer. This paint was subjected to 8 hours' circulating filtration by the use of a depth type filter having a 95% cut filtration accuracy of 1.2 μm. The procedure for the adjustment of viscosity was the same as mentioned above.

[Final Step]

The paint II for the magnetic layer was obtained by adding 0.8 part by weight of an isocyanate compound (produced by Nippon Polyurethane Kogyo K.K. and marketed under trademark designation of "Coronate L") to 100 parts by weight of the paint resulting from the filtration and mixing them by stirring.

Production of Paint for Forming Nonferromagnetic Undercoat Layer
[Preparation of Binder Solution]

The following components were thrown in an agitator and stirred therein for six hours to form a binder solution. This binder solution was subjected to 8 hours' circulating filtration by the use of a depth type filter having a 95% cut filtration accuracy of 5.0 μm to prepare a finished binder solution.

| | |
|---|---|
| Vinyl chloride type resin (produced by Nippon Zeon K.K. and marketed under product code of "MR-110") | 10 parts by weight |
| Polyester polyurethane resin (containing —$SO_3Na$ group, Mn = 25000, Tg = 20° C. | 5 parts by weight |
| Polyester polyurethane resin (containing —$SO_3Na$ group, Mn = 25000, Tg = −25° C.) | 2 parts by weight |
| MEK (methyl ethyl ketone) | 21 parts by weight |
| Toluene | 21 parts by weight |
| Cyclohexanone | 21 parts by weight |

[Kneading and Dispersing Treatment]

The following components were thrown into a pressure kneader and kneaded therein for two hours.

| | |
|---|---|
| α-$Fe_2O_3$ (major axis = 0.10 μm, axis ratio = 8) | 100 parts by weight |
| Carbon black (produced by Columbian Carbon Corp. and marketed under product code of "SC") | 9 parts by weight |
| Binder solution | 40 parts by weight |

The blend resulting from the kneading, after adding the following components, was adjusted to the optimum viscosity for the dispersing treatment.

| | |
|---|---|
| Binder solution | 40 parts by weight |
| MEK (methyl ethyl ketone) | 15 parts by weight |
| Toluene | 15 parts by weight |
| Cyclohexanone | 15 parts by weight |

The mixture resulting from the viscosity adjustment was dispersed by the use of a sand grinding mill.

[Viscosity Adjusting Step]

The following components were thrown into an agitator and stirred therein for one hour to form a viscosity adjusting liquid. The viscosity adjusting liquid was subjected to 8 hours' circulating filtration by the use of a depth type filter having a 95% cut filtration accuracy of 1.2 μm.

| | |
|---|---|
| Stearic acid | 0.5 part by weight |
| Myristic acid | 0.5 part by weight |
| Butyl stearate | 0.5 part by weight |
| MEK (methyl ethyl ketone) | 65 parts by weight |
| Toluene | 65 parts by weight |
| Cyclohexanone | 65 parts by weight |

The viscosity adjusting liquid resulting from the circulating filtration and the slurry from the dispersing treatment were mixed. The mixture was dispersed by the use of a sand grinding mill to adjust the viscosity of the paint to 40 cp and form a paint for forming a nonferromagnetic undercoat layer. This paint was subjected to 8 hours' circulating filtration by the use of a depth type filter having a 95% cut filtration accuracy of 1.2 μm. The procedure for the adjustment of viscosity was the same as mentioned above.

[Final Step]

The paint for the nonferromagnetic undercoat layer was obtained by adding 0.8 part by weight of an isocyanate compound (produced by Nippon Polyurethane Kogyo K.K. and marketed under trademark designation of "Coronate L") to 100 parts by weight of the paint resulting from the filtration and mixing them by stirring.

Production of Paint for Forming Backcoat Layer
[Preparation of Binder Solution]

The following components were thrown in an agitator and stirred therein for six hours to form a binder solution. This binder solution was subjected to 8 hours' circulating filtration by the use of a depth type filter having a 95% cut filtration accuracy of 5.0 μm to prepare a finished binder solution.

| | |
|---|---|
| Vinyl chloride type copolymer (vinyl chloride-vinyl acetate-vinyl alcohol-N,N-dimethyl ethanol amine-modified vinyl unit-maleic acid copolymer: monomer weight ratio = 91:3:5:0.5:0.5, average polymerization degree = 400) | 35 parts by weight |
| Polyester polyurethane resin (containing —$SO_3Na$ group, Mn = 40000, Tg = 20° C.) | 35 parts by weight |
| MEK (methyl ethyl ketone) | 100 parts by weight |
| Toluene | 80 parts by weight |
| Cyclohexanone | 100 parts by weight |

[Kneading and Dispersing Treatment]

The following components were thrown into a pressure kneader and kneaded therein for two hours.

| | |
|---|---|
| Carbon black (produced by Mitsubishi Chemical Industries, Ltd. and marketed under product code of "#47B") | 100 parts by weight |
| Carbon black (produced by Columbian Carbon Corp. and marketed under product code of "MT-CI") | 1 part by weight |
| α-$Fe_2O_3$ (major axis = 0.10 μm, axis ratio = 8) | 1 part by weight |
| Binder solution | 130 parts by weight |

The blend resulting from the kneading, after adding the following components, was adjusted to the optimum viscosity for the dispersing treatment.

| | |
|---|---|
| Binder solution | 45 parts by weight |
| MEK (methyl ethyl ketone) | 70 parts by weight |
| Toluene | 55 parts by weight |
| Cyclohexanone | 70 parts by weight |

The mixture resulting from the viscosity adjustment was dispersed by the use of a sand grinding mill.

[Viscosity Adjusting Step]

The following components were thrown into an agitator and stirred therein for one hour to form a viscosity adjusting liquid. The viscosity adjusting liquid was subjected to 8 hours' circulating filtration by the use of a depth type filter having a 95% cut filtration accuracy of 1.2 μm.

| | |
|---|---|
| Binding solution | 175 parts by weight |
| Stearic acid | 1 part by weight |
| Myristic acid | 1 part by weight |
| Butyl stearate | 1 part by weight |
| MEK (methyl ethyl ketone) | 200 parts by weight |
| Toluene | 250 parts by weight |
| Cyclohexanone | 200 parts by weight |

The viscosity adjusting liquid resulting from the circulating filtration and the slurry from the dispersing treatment were mixed. The mixture was dispersed by the use of a sand grinding mill to adjust the viscosity of the paint to 10 cp and form the paint for a backcoat layer. This paint was subjected to 8 hours's circulating filtration by the use of a depth type filter having a 95% cut filtration accuracy of 1.2 μm. The procedure for the adjustment of viscosity was the same as mentioned above.

[Final Step]

The paint for the backcoat layer was obtained by adding 1.0 part by weight of an isocyanate compound (produced by Nippon Polyurethane Kogyp K.K. and marketed under trademark designation of "Coronate L") to 100 parts by weight of the paint resulting from the filtration and mixing them by stirring.

The paints prepared as described above were subjected to trial application as follows.

TEST EXAMPLE 1

A coating for the formation of a magnetic layer was formed continuously by discharging the magnetic paint I mentioned above through the extrusion nozzle 20 of the apparatus illustrated in FIG. 4 onto one surface of a polyethylene terephthalate support, 15.0 μm in thickness, which was continuously running.

Then, a coating for the formation of a backcoat layer was continuously formed by discharging the paint for the formation of the backcoat layer through the extrusion nozzle 30 onto the other surface of the support while the coating for the formation of the magnetic layer was still in a wet state. Then, the magnetic layer (and the backcoat layer) was predried by means of the hot air nozzle 53 and subsequently passed along the orienting magnets 41 while the magnetic layer was in an undried state to effect orientation of the magnetic powder in the direction of running. Thereafter, the magnetic layer (and the backcoat layer) was dried and the support carrying the dried coating was provisionally rewound. By the use of the calendering device provided with seven steps of calender rolls, this support was given a calendering treatment at a temperature of 110° C. under a linear pressure of 300 kg/cm to smooth the surface of the coating. While FIG. 4 depicts a calendering treatment performed on the in-line system, the calendering treatment in the present test example 1 was carried out in a manner different from the in-line system illustrated in FIG. 4.

By using two species of magnetic paints, i.e. magnetic paint I and magnetic paint II, for discharge through the extrusion nozzle 20, producing the coatings in varied thicknesses, and adopting three coating methods, i.e. coating method A1, coating method A2, and coating method Bt, the various samples I-1–I-17 shown in the following Table 1 were manufactured.

Coating method A1: This comprises applying the paint for the magnetic layer and then applying the paint for the backcoat layer while the coating of the magnetic layer was in a wet state (corresponding to the applying method described above).

Coating method A2: This comprises applying the paint for the backcoat layer and then applying the paint for the magnetic layer while the paint for the backcoat layer was in a wet state.

Coating method B1: This comprised applying the paint for the magnetic layer, subjecting the resultant coating to an orienting treatment, a drying treatment, and a calendering treatment, and then applying the paint for the backcoat layer.

These samples were severally tested for degree of orientation and residual magnetic flux density Br. These properties were determined by the following methods.

Degree of Orientation and Residual Magnetic Flux Density Br

The magnetic property of a tape sample was measured by the use of a vibrating sample magnetometer (produced by Toei Kogyosha K.K. and-marketed under product code of "VSM-V") using a maximum external magnetic field of 10 kOe.

Incidentally, the degree of orientation is defined by the expression, $(Br/Bm)_{MD}/(Br/Bm)_{TD}$, wherein Bm represents a saturated magnetic flux density, MD the longitudinal direction of the tape, and TD the lateral direction of the tape.

The results are shown in Table 1 below.

TABLE 1

| | | Magnetic Layer | BC Layer | | |
|---|---|---|---|---|---|
| Sample No. | Magnetic Paint | Thickness (μm) | Thickness (μm) | Coating Method | Degree of Orientation | Br |
| I-1 | Paint I | 2.0 | 0.5 | A1 | 2.90 | 1780 |
| I-2 | Paint I | 2.5 | 0.5 | A1 | 2.95 | 1800 |
| I-3 | Paint II | 0.8 | 0.5 | A1 | 2.80 | 2900 |
| I-4 | Paint II | 0.3 | 0.2 | A1 | 2.60 | 2800 |
| I-5 | Paint II | 0.3 | 0.5 | A1 | 2.75 | 2890 |
| I-6 | Paint II | 0.3 | 2.0 | A1 | 2.70 | 2860 |
| I-7 | Paint II | 2.0 | 0.5 | A1 | 2.77 | 2890 |
| I-8 | Paint I | 2.0 | 0.5 | A2 | 2.92 | 1800 |
| I-9 | Paint II | 0.8 | 0.5 | A2 | 2.83 | 2930 |
| I-10 | Paint II | 0.3 | 0.2 | A2 | 2.63 | 2830 |
| I-11 | Paint II | 0.3 | 0.5 | A2 | 2.77 | 2900 |
| I-12 | Paint II | 0.3 | 2.0 | A2 | 2.73 | 2850 |
| I-13 | Paint II | 2.0 | 0.5 | A2 | 2.78 | 2900 |

TABLE 1-continued

| Sample No. | Magnetic Paint | Magnetic Layer Thickness (μm) | BC Layer Thickness (μm) | Coating Method | Degree of Orientation | Br |
|---|---|---|---|---|---|---|
| I-14* | Paint I | 2.0 | 0.5 | B1 | 2.35 | 1600 |
| I-15* | Paint I | 2.5 | 0.5 | B1 | 2.45 | 1640 |
| I-16* | Paint II | 0.8 | 0.5 | B1 | 2.20 | 2700 |
| I-17* | Paint II | 0.3 | 0.2 | B1 | 1.90 | 2400 |

*Outside the scope of this invention (comparison)
BC layer: Backcoat layer

TEST EXAMPLE 2

The magnetic paint I and the magnetic paint II were continuously discharged through the two closely disposed extrusion nozzles onto one surface of a continuously running polyethylene terephthalate support, 8.3 μm in thickness, to form continuously a laminate of the coating for the formation of a lower magnetic layer and the coating for the formation of an upper magnetic layer.

Then, the paint for the formation of the backcoat layer was discharged through the extrusion nozzle 30 onto the other surface of the support while the coatings for the formation of the two magnetic layers were in a wet state to form continuously the coating for the formation of the backcoat layer. The two magnetic layers (and the backcoat layer) were predried by the use of the hot air nozzle 53 and were passed along the orienting magnets 41 while the two magnetic layers were in an undried state to effect orientation of the magnetic powder in the direction of running. Then, the two magnetic layers (and the backcoat layer) were dried and the support carrying the dried coatings was provisionally rewound. By the use of the calendering device provided with seven steps of calender rolls, this support carrying the dried coatings was given a calendering treatment at a temperature of 110° C. under a linear pressure of 300 kg/cm to smooth the surface of the coating. The calendering treatment in the present test example 2 was carried out in a manner different from the in-line system illustrated in FIG. 4.

By producing the upper magnetic layer and the lower magnetic layer in varied thicknesses and adopting six coating methods, i.e. coating method A3, coating method A4, coating method A5, coating method A6, coating method A7, and coating method B2, the various samples II-1–II-9 shown in the following Table 2 were manufactured.

Coating method A3: This comprised applying the paint for the lower magnetic layer, applying the paint for the upper magnetic layer while the paint for the lower magnetic layer was in a wet state, and applying the paint for the backcoat layer while the paints for the two magnetic layers were in a wet state (corresponding to the coating method described above).

Coating method A4: This comprised applying the paint for the backcoat layer and then applying the paint for the lower magnetic layer and the paint for the upper magnetic layer sequentially in the order mentioned while the paint for the backcoat layer was in a wet state (at which time the paints for the two magnetic layers were each in a wet state).

Coating method A5: This comprised simultaneously applying the paint for the lower magnetic layer and the paint for the upper magnetic layer in a superposed manner and then applying the paint for the backcoat layer while the paints for the two magnetic layers were in a wet state.

Coating method A6: This comprised applying the paint for the backcoat layer and then applying the paint for the lower magnetic layer and the paint for the upper magnetic layer simultaneously while the paint for the backcoat layer was in a wet state.

Coating method A7: This comprised applying the paint for the lower magnetic layer, applying the paint for the backcoat layer while the paint for the lower magnetic layer was in a wet state, and applying the paint for the upper magnetic layer while the paints for the two layers mentioned above were in a wet state.

Coating method B2: This comprised applying the paint for the lower magnetic layer, applying the paint for the upper magnetic layer while the paint for the lower magnetic layer was in a wet state, subjecting the two coatings consequently formed to an orienting treatment, a drying treatment, and a calendering treatment, and thereafter applying the paint for the backcoat layer.

These samples were severally tested for degree of orientation and residual magnetic flux density Br.

The results are shown in Table 2 below

TABLE 2

| Sample No. | Upper Magnetic Layer Magnetic Paint | Upper Magnetic Layer Thickness (μm) | Lower Magnetic Layer Magnetic Paint | Lower Magnetic Layer Thickness (μm) | BC Layer Thickness (μm) | Coating Method | Degree of Orientation | Br |
|---|---|---|---|---|---|---|---|---|
| II-1 | Paint II | 0.3 | Paint I | 1.7 | 0.5 | A3 | 2.85 | 1900 |
| II-2 | Paint II | 0.2 | Paint I | 1.8 | 0.5 | A3 | 2.62 | 1850 |
| II-3 | Paint II | 0.3 | Paint I | 1.7 | 0.5 | A4 | 2.86 | 1910 |
| II-4 | Paint II | 0.2 | Paint I | 1.8 | 0.5 | A4 | 2.82 | 1840 |
| II-5 | Paint II | 0.2 | Paint I | 1.8 | 0.5 | A5 | 2.83 | 1860 |
| II-6 | Paint II | 0.2 | Paint I | 1.8 | 0.5 | A6 | 2.84 | 1870 |
| II-7 | Paint II | 0.2 | Paint I | 1.8 | 0.5 | A7 | 2.83 | 1860 |

TABLE 2-continued

| Sample No. | Upper Magnetic Layer Magnetic Paint | Upper Magnetic Layer Thickness (μm) | Lower Magnetic Layer Magnetic Paint | Lower Magnetic Layer Thickness (μm) | BC Layer Thickness (μm) | Coating Method | Degree of Orientation | Br |
|---|---|---|---|---|---|---|---|---|
| II-8* | Paint II | 0.3 | Paint I | 1.7 | 0.5 | B2 | 2.10 | 1700 |
| II-9* | Paint II | 0.2 | Paint I | 1.8 | 0.5 | B2 | 2.08 | 1680 |

*Outside the scope of this invention (comparison)
BC layer: Backcoat layer

TEST EXAMPLE 3

The magnetic paint I mentioned above was applied to one surface of a continuously running polyethylene terephthalate support, 8.3 μm in thickness, to form the coating of the lower magnetic layer and the coating thus formed was subjected to an orienting treatment, a drying treatment, and a calendering treatment. Then, the magnetic paint II mentioned above was applied by means of the extrusion nozzle to the lower magnetic layer to form the coating of the upper magnetic layer and the paint for the formation of the backcoat layer was discharged through the extrusion nozzle to the other surface of the support while the coating for the formation of the upper magnetic layer was in a wet state to form the coating for the formation of the backcoat layer continuously. Then, the upper magnetic layer (and the backcoat layer) was predried by the hot air nozzle and passed along the orienting magnets while the upper magnetic layer was in an undried state to effect orientation of the magnetic powder in the direction of running. Subsequently, the upper magnetic layer (and the backcoat layer) was dried and the support carrying the dried coating was provisionally rewound. By the use of the calendering device provided with seven steps of calender rolls, this support carrying the dried coating was given a calendering treatment at a temperature of 110° C. under a linear pressure of 300 kg/cm to smooth the surface of the coating. The calendering treatment in the present test example 3 was carried out in a manner different from the in-line system illustrated in FIG. 4.

By producing the upper magnetic layer and the lower magnetic layer in varied thicknesses and adopting three coating methods, i.e. coating method A9, coating method A9, and coating method B3, the various samples III-1–III-6 shown in the following Table 3 were manufactured.

Coating method A8: This comprised applying the paint for the lower magnetic layer, subjecting the coating consequently formed to an orienting treatment, a drying treatment, and a calendering treatment, then applying the paint for the upper magnetic layer, and applying the paint for the backcoat layer while the paint for the upper magnetic layer was in a wet state (corresponding to the coating method described above).

Coating method A9: This comprised applying the paint for the lower magnetic layer, subjecting the coating consequently formed to an orienting treatment, a drying treatment, and a calendering treatment, then applying the paint for the backcoat layer, and applying the paint for the upper magnetic layer while the paint for the backcoat layer was in a wet state (at which time, the paint for the upper magnetic layer was in a wet state).

Coating method B3: This comprised applying the paint for the lower magnetic layer, subjecting the resultant coating to an orienting treatment, a drying treatment, and a calendering treatment, then applying the paint for the upper magnetic layer, subjecting the upper magnetic layer to an orienting treatment, a drying treatment, and a calendering treatment, and then applying the paint for the backcoat layer.

These samples were severally tested for degree of orientation and residual magnetic flux density Br.

The results are shown in Table 3 below.

TABLE 3

| Sample No. | Upper Magnetic Layer Magnetic Paint | Upper Magnetic Layer Thickness (μm) | Lower Magnetic Layer Magnetic Paint | Lower Magnetic Layer Thickness (μm) | BC Layer Thickness (μm) | Coating Method | Degree of Orientation | Br |
|---|---|---|---|---|---|---|---|---|
| III-1 | Paint II | 0.3 | Paint I | 1.7 | 0.5 | A8 | 2.75 | 1880 |
| III-2 | Paint II | 0.2 | Paint I | 1.8 | 0.5 | A8 | 2.62 | 1820 |
| III-3 | Paint II | 0.3 | Paint I | 1.7 | 0.5 | A9 | 2.74 | 1870 |
| III-4 | Paint II | 0.2 | Paint I | 1.8 | 0.5 | A9 | 2.62 | 1820 |
| III-5* | Paint II | 0.3 | Paint I | 1.7 | 0.5 | B3 | 1.95 | 1630 |
| III-6* | Paint II | 0.2 | Paint I | 1.8 | 0.5 | B3 | 1.70 | 1600 |

*Outside the scope of this invention (comparison)
BC layer: Backcoat layer

TEST EXAMPLE 4

The paint for forming the nonferromagnetic undercoat layer and the magnetic paint II mentioned above were continuously discharged through two closed disposed extrusion nozzles onto one surface of a continuously running polyethylene terephthalate support, 8.3 μm in thickness, to form continuously a laminate of the coating for forming the nonferromagnetic undercoat layer and the coating for forming the upper magnetic layer.

Then, the paint for forming the backcoat layer was discharged through the extrusion nozzle onto the other surface of the support while the two paints were in a wet state to form continuously the paint for forming the backcoat layer. Then, these paints were predried by the use of the hot air nozzle and passed along the orienting magnets while the upper magnetic layer was in an undried state to effect orientation of the magnetic powder in the direction of running. Subsequently, the upper magnetic layer (and the nonferromagnetic undercoat layer and the backcoat layer) was dried and the support carrying the dried coating was provisionally rewound. By the use of the calendering device provided with seven steps of calender rolls, this support carrying the dried coating was given a calendering treatment at a temperature of 110° C. under a linear pressure of 300 kg/cm to smooth the surface of the coating. The calendering treatment in the present test example 4 was carried out in a manner different from the in-line system illustrated in FIG. 4.

By producing the upper magnetic layer and the nonferromagnetic undercoat layer in varied thicknesses and adopting six coating methods, i.e. coating method A10, coating method A11, coating method A12, coating method A13, coating method A14, and coating method B4, the various samples IV-1–IV-9 shown in the following Table 4 were manufactured.

Coating method A10: This comprised applying the paint for the nonferromagnetic undercoat layer, applying the paint for the upper magnetic layer while the paint for the nonferromagnetic undercoat layer was in a wet state, and applying the paint for the backcoat layer while the paints for the two layers were in a wet state (corresponding to the coating method described above).

Coating method A11: This comprised applying the paint for the backcoat layer and then applying sequentially the paint for the nonferromagnetic undercoat layer and the paint for the upper magnetic layer while the paint for the backcoat layer was in a wet state (at which time the two paints were each in a wet state).

Coating method A12: This comprised applying the paint for the nonferromagnetic undercoat layer and the paint for the upper magnetic layer simultaneously and applying the paint for the backcoat layer while the paints for the two layers were in a wet state.

Coating method A13: This comprised applying the paint for the backcoat layer and then applying the paint for the nonferromagnetic undercoat layer and the paint for the upper magnetic layer simultaneously while the paint for the backcoat layer was in a wet state.

Coating method A14: This comprised applying the paint for the nonferromagnetic undercoat layer, applying the paint for the backcoat layer while the paint for the nonferromagnetic undercoat layer was in a wet state, and applying the paint for the upper magnetic layer while the paints of the two layers were in a wet state.

Coating method B4: This comprised applying the paint for the nonferromagnetic undercoat layer, applying the paint for the upper magnetic layer while the paint for the nonferromagnetic undercoat layer was in a wet state, subjecting the coatings of the two layers to an orienting treatment, a drying treatment, and a calendering treatment, and then applying the paint for the backcoat layer.

These samples were severally tested for degree of orientation and residual magnetic flux density Br.

The results are shown in Table 4 below.

TABLE 4

| Sample No. | Upper Magnetic Layer | | Nonferrous Magnetic Undercoat Layer Thickness ($\mu$m) | BC Layer Thickness ($\mu$m) | Coating Method | Degree of Orientation | Br |
|---|---|---|---|---|---|---|---|
| | Magnetic Paint | Thickness ($\mu$m) | | | | | |
| IV-1 | Paint II | 0.20 | 1.80 | 0.5 | A10 | 2.95 | 2980 |
| IV-2 | Paint II | 0.15 | 1.85 | 0.5 | A10 | 2.90 | 2930 |
| IV-3 | Paint II | 0.20 | 1.80 | 0.5 | A11 | 2.97 | 3000 |
| IV-4 | Paint II | 0.15 | 1.85 | 0.5 | A11 | 2.93 | 2950 |
| IV-5 | Paint II | 0.15 | 1.85 | 0.5 | A12 | 2.95 | 2990 |
| IV-6 | Paint II | 0.15 | 1.85 | 0.5 | A13 | 2.94 | 2970 |
| IV-7 | Paint II | 0.15 | 1.85 | 0.5 | A14 | 2.96 | 3000 |
| IV-8* | Paint II | 0.20 | 1.80 | 0.5 | B4 | 2.05 | 2500 |
| IV-9* | Paint II | 0.15 | 1.85 | 0.5 | B4 | 2.01 | 2490 |

*Outside the scope of this invention (comparison)
BC layer: Backcoat layer

TEST EXAMPLE 5

The paint for the nonferromagnetic undercoat layer was applied to one surface of a continuously running polyethylene terephthalate support, 8.3 $\mu$m in thickness and the coating consequently formed was dried and subjected to a calendering treatment to form the coating of the nonferromagnetic undercoat layer. Then, the magnetic paint II mentioned above was applied by the use of the extrusion nozzle to the nonferromagnetic undercoat layer to form the coating of the upper magnetic layer and the paint for forming the backcoat layer was discharged through the extrusion nozzle onto the other surface of the support while the coating for the formation of the upper magnetic layer was in a wet state to form continuously the coating for the formation of the backcoat layer. Then, the upper magnetic layer (and the backcoat layer) was predried by the use of the hot air nozzle and passed along the orienting magnets while the upper magnetic layer was in an undried state to effect orientation of the magnetic powder in the direction of running. Subsequently, the upper magnetic layer (and the backcoat layer and the backcoat layer) was dried and the support carrying the dried coating was provisionally rewound.

By the use of the calendering device provided with seven steps of calender rolls, this support carrying the dried coating was given a calendering treatment at a temperature of 110° C. under a linear pressure of 300 kg/cm to smooth the surface of the coating. The calendering treatment in the present test example 5 was carried out in a manner different from the in-line system illustrated in FIG. 4.

By producing the upper magnetic layer and the nonferromagnetic undercoat layer in varied thicknesses and adopting three coating methods, i.e. coating method A15, coating method A16, and coating method B5, the various samples V-1–V-6 shown in the following Table 5 were manufactured.

Coating method A15: This comprised applying the paint for the nonferromagnetic undercoat layer, subjecting the resultant coating to a drying treatment and a calendering treatment, then applying the paint for the upper magnetic layer, and applying the paint for the backcoat layer while the paint for the upper magnetic layer was in a wet state (corresponding to the coating method described above).

Coating method A16: This comprised applying the paint for the nonferromagnetic undercoat layer, subjecting the resultant coating to a drying treatment and a calendering treatment, applying the paint for the backcoat layer, and applying the paint for the upper magnetic layer while the paint for the backcoat layer was in a wet state (at which time the paint for the upper magnetic layer was in a wet state).

Coating method B5: This comprised applying the paint for the nonferromagnetic undercoat layer, subjecting the resultant coating to a drying treatment and a calendering treatment, then applying the paint for the upper magnetic layer, subjecting the upper magnetic layer to an orienting treatment, a drying treatment, and a calendering treatment, and then applying the paint for the backcoat layer.

These samples were severally tested for degree of orientation and residual magnetic flux density Br.

The results are shown in Table 5.

Surface Roughness, Ra, of Magnetic Layer

This property was determined by the method described in JIS (Japanese Industrial Standard) B-0601, using a probe type surface contour tester (produced by Taylor Hobbson Corp.), a Talystep system. The concrete conditions for the determination follows Filter condition: 0.18–9 Hz Probe pressure: 2 mg Stylus used: Special stylus, $0.1 \times 2.5$ $\mu$m Scan speed: 0.03 mm/sec Scan length: 500 $\mu$m The magnitude, Ra, was calculated from the result of the determination.

Loss of Applied Layer of Paint

The loss was expressed by the quotient in % obtained by dividing the length of loss in the applied layer of paint incurred until completion of the calendering treatment by the length of the applied layer of paint (10000 m). The rating was made on the four-point scale, wherein ⊚ . . . A loss of less than 3%

○ . . . A loss exceeding 3% and not exceeding 5%

Δ . . . A loss exceeding 5% and not exceeding 8%

X . . . A loss exceeding 8%

TABLE 5

| Sample No. | Upper Magnetic Layer | | Nonferrous Magnetic Undercoat Layer Thickness ($\mu$m) | BC Layer Thickness ($\mu$m) | Coating Method | Degree of Orientation | Br |
|---|---|---|---|---|---|---|---|
| | Magnetic Paint | Thickness ($\mu$m) | | | | | |
| V-1 | Paint II | 0.20 | 1.80 | 0.5 | A15 | 2.85 | 2920 |
| V-2 | Paint II | 0.15 | 1.85 | 0.5 | A15 | 2.80 | 2900 |
| V-3 | Paint II | 0.20 | 1.80 | 0.5 | A16 | 2.88 | 2930 |
| V-4 | Paint II | 0.15 | 1.85 | 0.5 | A16 | 2.84 | 2910 |
| V-5* | Paint II | 0.20 | 1.80 | 0.5 | B5 | 1.90 | 2450 |
| V-6* | Paint II | 0.15 | 1.85 | 0.5 | B5 | 1.65 | 2300 |

*Outside the scope of this invention (comparison)
BC layer: Backcoat layer

TEST EXAMPLE 6

In the production of the samples I-1, I-2, and I-3 in TEST EXAMPLE 1 mentioned above, the calendering operation was carried out on the in-line system. Specifically, the support carrying the dried coating was not provisionally rewound before it was subjected to the calendering treatment and the calendering step was effected on the in-line system as illustrated in FIG. 4. In all the other respects, the samples VI-1, VI-2, and VI-3 were produced herein in the same manner as the samples I-1, I-2, and I-3 of Test Example 1. The calendering operation herein was performed under the same conditions as those of Test Example 1 mentioned above.

These samples were severally rated for surface roughness, Ra, of the magnetic layer and for loss of the applied layer of the paint. The following methods were used for the rating.

The results are shown in Table 6 below.

TABLE 6

| Sample No. | Magnetic Layer | | BC Layer Thickness ($\mu$m) | Calendering Method | Ra ($\mu$m) | Loss of Applied layer of Paint |
|---|---|---|---|---|---|---|
| | Magnetic Paint | Thickness ($\mu$m) | | | | |
| VI-1 | Paint I | 2.0 | 0.5 | In-line | 5.0 | ⊚ |
| VI-2 | Paint I | 2.5 | 0.5 | In-line | 4.8 | ⊚ |

TABLE 6-continued

| Sample No. | Magnetic Layer Magnetic Paint | Magnetic Layer Thickness (μm) | BC Layer Thickness (μm) | Calendering Method | Ra (μm) | Loss of Applied layer of Paint |
|---|---|---|---|---|---|---|
| VI-3 | Paint II | 0.8 | 0.5 | In-line | 4.0 | ⊙ |
| I-1 | Paint I | 2.0 | 0.5 | Separate line | 7.2 | Δ |
| I-2 | Paint I | 2.5 | 0.5 | Separate line | 6.9 | Δ |
| I-3 | Paint II | 0.8 | 0.5 | Separate line | 6.0 | Δ |

TEST EXAMPLE 7

In the production of the samples II-1 and II-2 in Test Example 2 mentioned above, the calendering operation was carried out on the in-line system. Specifically, the support carrying the dried coating was not provisionally rewound before it was subjected to the calendering treatment and the calendering step was effected on the in-line system as illustrated in FIG. 4. In all the other respects, the samples VII-1 and VII-2 were produced herein in the same manner as the samples II-1 and II-2 of Test Example 2. The calendering operation herein was performed under the same conditions as those of Test Example 2 mentioned above.

These samples were severally rated for surface roughness, Ra, of the magnetic layer and for loss of the applied layer of the paint. The following methods were used for the rating.

The results are shown in Table 7 below.

TABLE 7

| Sample No. | Upper Magnetic Layer Magnetic Paint | Upper Magnetic Layer Thickness (μm) | Lower Magnetic Layer Magnetic Paint | Lower Magnetic Layer Thickness (μm) | BC Layer Thickness (μm) | Calendering Method | Ra (μm) | Loss of Applied layer of Paint |
|---|---|---|---|---|---|---|---|---|
| VII-1 | Paint II | 0.3 | Paint I | 1.7 | 0.5 | In-line | 4.2 | ⊙ |
| VII-2 | Paint II | 0.2 | Paint I | 1.8 | 0.5 | In-line | 4.1 | ⊙ |
| II-1 | Paint II | 0.3 | Paint I | 1.7 | 0.5 | Separate line | 6.5 | Δ |
| II-2 | Paint II | 0.2 | Paint I | 1.8 | 0.5 | Separate line | 6.6 | Δ |

TEST EXAMPLE 8

In the production of the samples III-1 and III-2 in Test Example 3 mentioned above, the calendering operation on the upper and the lower layer was carried out on the in-line system. Specifically. the support carrying the dried coating was not provisionally rewound before it was subjected to the calendering treatment and the calendering step was effected on the in-line system as illustrated in FIG. 4. In all the other respects, the samples VIII-1 and VIII-2 were produced herein in the same manner as the samples III-1 and III-2 of Test Example 3. The calendering operation herein was performed under the same conditions as those of Test Example 3 mentioned above.

These samples were severally rated for surface roughness, Ra, of the magnetic layer and for loss of the applied layer of the paint. The following methods were used for the rating.

The results are shown in Table 8 below.

TABLE 8

| Sample No. | Upper Magnetic Layer Magnetic Paint | Upper Magnetic Layer Thickness (μm) | Lower Magnetic Layer Magnetic Paint | Lower Magnetic Layer Thickness (μm) | BC Layer Thickness (μm) | Calendering Method | Ra (μm) | Loss of Applied layer of Paint |
|---|---|---|---|---|---|---|---|---|
| VIII-1 | Paint II | 0.3 | Paint I | 1.7 | 0.5 | In-line | 4.6 | ○ |
| VIII-2 | Paint II | 0.2 | Paint I | 1.8 | 0.5 | In-line | 4.5 | ○ |
| III-1 | Paint II | 0.3 | Paint I | 1.7 | 0.5 | Separate line | 7.0 | × |
| III-2 | Paint II | 0.2 | Paint I | 1.8 | 0.5 | Separate line | 7.2 | × |

TEST EXAMPLE 9

In the production of the samples IV-1 and IV-2 in Test Example 4 mentioned above, the calendering operation was carried out on the in-line system. Specifically, the support carrying the dried coating was not provisionally rewound before it was subjected to the calendering treatment and the calendering step was effected on the in-line system as illustrated in FIG. 4. In all the other respects, the samples IX-1 and IX-2 were produced herein in the same manner as the samples IV-1 and IV-2 of Test Example 4. The calendering operation herein was performed under the same conditions as those of Test Example 4 mentioned above.

These samples were severally rated for surface roughness, Ra, of the magnetic layer and for loss of the applied layer of the paint. The following methods were used for the rating.

The results are shown in Table 9 below.

TABLE 9

| Sample No. | Upper Magnetic Layer | | Nonferrous Magnetic Undercoat Layer Thickness (μm) | BC Layer | Calendering Method | Ra (μm) | Loss of Applied layer of Paint |
|---|---|---|---|---|---|---|---|
| | Magnetic Paint | Thickness (μm) | | Thickness (μm) | | | |
| IX-1 | Paint II | 0.20 | 1.80 | 0.5 | In-line | 3.8 | ◉ |
| IX-2 | Paint II | 0.15 | 1.85 | 0.5 | In-line | 3.6 | ◉ |
| IV-1 | Paint II | 0.20 | 1.80 | 0.5 | Separate line | 5.7 | Δ |
| IV-2 | Paint II | 0.15 | 1.85 | 0.5 | Separate line | 5.6 | Δ |

TEST EXAMPLE 10

In the production of the samples V-1 and V-2 in Test Example 4 mentioned above, the calendering operation on the upper and the lower layer was carried out on the in-line system. Specifically, the support carrying the dried coating was not provisionally rewound before it was subjected to the calendering treatment and the calendering step was effected on the in-line system as illustrated in FIG. 4. In all the other respects, the samples X-1 and X-2 were produced herein in the same manner as the samples V-1 and V-2 of Test Example 5. The calendering operation herein was performed under the same conditions as those of Test Example 5 mentioned above.

These samples were severally rated for surface roughness, Ra, of the magnetic layer and for loss of the applied layer of the paint. The following methods were used for the rating.

The results are shown in Table 10 below.

TABLE 10

| Sample No. | Upper Magnetic Layer | | Nonferrous Magnetic Undercoat Layer Thickness (μm) | BC Layer | Calendering Method | Ra (μm) | Loss of Applied layer of Paint |
|---|---|---|---|---|---|---|---|
| | Magnetic Paint | Thickness (μm) | | Thickness (μm) | | | |
| X-1 | Paint II | 0.20 | 1.80 | 0.5 | In-line | 4.0 | ○ |
| X-2 | Paint II | 0.15 | 1.85 | 0.5 | In-line | 4.1 | ○ |
| V-1 | Paint II | 0.20 | 1.80 | 0.5 | Separate line | 6.7 | × |
| V-2 | Paint II | 0.15 | 1.85 | 0.5 | Separate line | 6.5 | × |

The effect of this invention is evident from the results given above. To be specific, this invention allows production of a coating excelling in the degree of orientation in spite of a decrease in the thickness of the magnetic layer and further imparts a high degree of packing and high durability to the magnetic layer of a decreased thickness by ensuring the presence of a backcoat layer in an infallibly undried state (particularly in a wet state) while the magnetic coating is in an undried state (particularly in a wet state). Further, it permits efficient provision of the backcoat layer which used to impose a heavy load on the conventional process. When the calendering operation is preferably carried out on the in-line system, the processibility of calendering at the calendering step can be exalted, the surface quality of the magnetic layer can be greatly improved, and the loss of the applied layer of the paint which used to occur in the separate calendering step of the conventional line can be cut.

What is claimed is:

1. A method for the production of a magnetic recording medium provided on one surface of a nonmagnetic support thereof with a magnetic layer and on the other surface of said nonmagnetic support with a backcoat layer, comprising a step of applying a magnetic paint for the formation of said magnetic layer to one surface of said nonmagnetic support, a step of applying a paint for the formation of said backcoat layer to the other surface of said nonmagnetic support, and a step of applying a magnetic field thereby effecting an orienting treatment after said magnetic paint for the formation of the magnetic layer and said paint for the formation of the backcoat layer have been applied and before the magnetic paint for the formation of the magnetic layer has dried, wherein said magnetic paint for the formation of the magnetic layer and said paint for the formation of the backcoat layer both retain an undried state after they have been both applied to the nonmagnetic support.

2. A method according to claim 1, wherein the step of applying the magnetic paint for the formation of the magnetic layer and the step of applying the paint for the formation of the backcoat layer are sequentially carried out in order, the magnetic paint for the formation of the magnetic layer applied first is in a wet state during the course of the step of applying the paint for the formation of the backcoat layer, and then the magnetic field is applied to effect the orienting treatment while the magnetic paint for the formation of the magnetic layer is in an undried state.

3. A method according to claim 1, wherein the step of applying the paint for the formation of the backcoat layer and the step of applying the magnetic paint for the formation of the magnetic layer are sequentially carried out in order, the paint for the formation of the backcoat layer applied first is in a wet state during the course of the step of applying the magnetic paint for the formation of the magnetic layer, and then the magnetic field is applied to effect the orienting treatment while the magnetic paint for the formation of the magnetic layer is in an undried state.

4. A method for the production of a magnetic recording medium provided on one surface of a nonmagnetic support thereof with a lower magnetic layer, on said lower magnetic layer with an upper magnetic layer, and on the other surface of said nonmagnetic support with a backcoat layer, comprising a step of applying a magnetic paint for the formation of said lower magnetic layer to one surface of said nonmagnetic support, a step of applying a magnetic paint for the formation of said upper magnetic layer to the layer of said magnetic paint for the formation of said lower magnetic layer applied to said nonmagnetic support, a step of applying a paint for the formation of said backcoat layer to the other surface of said nonmagnetic support, and a step of applying a magnetic field thereby effecting an orienting treatment after said magnetic paint for the formation of said lower magnetic layer, said magnetic paint for the formation of said upper magnetic layer, and said paint for the formation of said backcoat layer have been applied and before said magnetic paint for the formation of said upper magnetic layer has dried, wherein said magnetic paint for the formation of said upper magnetic layer and said paint for the formation of said backcoat layer retain an undried state after they have been both applied to the nonmagnetic support.

5. A method according to claim 4, wherein the step of applying said magnetic paint for the formation of said lower magnetic layer and the step of applying said magnetic paint for the formation of said upper magnetic layer are simultaneously carried out, then the step of applying said paint for the formation of said backcoat layer is carried out, said magnetic paint for the formation of said lower magnetic layer and said magnetic paint for the formation of said upper magnetic layer applied first are in a wet state during the course of the step of applying said paint for the formation of said backcoat layer, and then said magnetic field is applied to effect an orienting treatment before said magnetic paints have dried.

6. A method according to claim 4, wherein the step of applying said magnetic paint for the formation of said lower magnetic layer, the step of applying said magnetic paint for the formation of said upper magnetic layer, and the step of applying said paint for the formation of said backcoat layer are sequentially carried out in order, said magnetic paint for the formation of said lower magnetic layer applied first and said magnetic paint for the formation of said upper magnetic layer are in a wet state during the course of the step of applying said paint for the formation of said backcoat layer, and then said magnetic field is applied to effect an orienting treatment before said magnetic paints have dried.

7. A method according to claim 4, wherein the step of applying said magnetic paint for the formation of said lower magnetic layer, the step of applying said paint for the formation of said backcoat layer, and the step of applying said magnetic paint for the formation of said upper magnetic layer are sequentially carried out in order, said magnetic paint for the formation of said lower magnetic layer applied first and said paint for the formation of said backcoat layer are in a wet state during the course of the step of applying said magnetic paint for the formation of said upper magnetic layer, and then said magnetic field is applied to effect an orienting treatment before said magnetic paint for the formation of said lower magnetic layer and said magnetic paint for the formation of said upper magnetic layer have dried.

8. A method according to claim 4, wherein the step of applying said magnetic paint for the formation of said lower magnetic layer and the step of applying said magnetic paint for the formation of said upper magnetic layer are simultaneously carried out after the step of applying said paint for the formation of said backcoat layer, said paint for the formation of said backcoat layer first applied is in a wet state during the course of the step of applying said magnetic paints, and then said magnetic field is applied to effect an orienting treatment before said magnetic paint for the formation of said lower magnetic layer and said magnetic paint for the formation of said upper magnetic layer have dried.

9. A method according to claim 4, wherein the step of applying said paint for the formation of said backcoat layer, the step of applying said magnetic paint for the formation of said lower magnetic layer, and the step of applying said magnetic paint for the formation of said upper magnetic layer are sequentially carried out in order, said paint for the formation of said backcoat layer applied first and said magnetic paint for the formation of said lower magnetic layer are in a wet state during the course of the step of applying said magnetic paint for the formation of said upper magnetic layer, and then said magnetic field is applied to effect an orienting treatment before said magnetic paint for the formation of said lower magnetic layer and said magnetic paint for the formation of said upper magnetic layer have dried.

10. A method according to claim 4, wherein the step of applying said magnetic paint for the formation of said upper magnetic layer and the step of applying said paint for the formation of said backcoat layer are sequentially carried out in order after the step of applying and drying said magnetic paint for the formation of said lower magnetic layer, said magnetic paint for the formation of said upper magnetic layer is in a wet state during the course of the step of applying said paint for the formation of said backcoat layer, and then said magnetic field is applied to effect an orienting treatment before said magnetic paint for the formation of said upper magnetic layer has dried.

11. A method according to claim 4, wherein the step of applying said paint for the formation of said backcoat layer and the step of applying said magnetic paint for the formation of said upper magnetic layer are sequentially carried out in order after the step of applying and drying said magnetic paint for the formation of said lower magnetic layer, said paint for the formation of said backcoat layer is in a wet state during the course of the step of applying said magnetic paint for the formation of said upper magnetic layer, and then said magnetic field is applied to effect an orienting treatment before said magnetic paint for the formation of said upper magnetic layer has dried.

12. A method for the production of a magnetic recording medium provided on one surface of a nonmagnetic support thereof with a nonferromagnetic undercoat layer, on said nonferromagnetic undercoat layer with an upper magnetic layer, and on the other surface of said nonmagnetic support with a backcoat layer, comprising a step of applying a paint for the formation of said nonferromagnetic undercoat layer to one surface of said nonmagnetic support, a step of applying a magnetic paint for the formation of said upper magnetic layer to the layer of said paint for the formation of said nonferromagnetic undercoat layer applied to said nonmagnetic support, a step of applying a paint for the formation of said backcoat layer to the other surface of said nonmagnetic support, and a step of applying a magnetic field thereby effecting an orienting treatment after said paint for the formation of said nonferromagnetic undercoat layer, said magnetic paint for the formation of said upper magnetic layer, and said paint for the formation of said backcoat layer have been applied and before said magnetic paint for the formation of said upper magnetic layer has dried, wherein said magnetic paint for the formation of said upper magnetic layer and said paint for the formation of said backcoat layer retain an undried state after they have been both applied to the nonmagnetic support.

13. A method according to claim 12, wherein the step of applying said paint for the formation of said nonferromagnetic undercoat layer and the step of applying said magnetic paint for the formation of said upper magnetic layer are simultaneously carried out, then the step of applying said paint for the formation of said backcoat layer is carried out, said paint for the formation of said nonferromagnetic undercoat layer and said magnetic paint for the formation of said upper magnetic layer applied first are in a wet state during the course of the step of applying said paint for the formation of said backcoat layer, and then said magnetic field is applied to effect an orienting treatment before said magnetic paint for the formation of said upper magnetic layer have dried.

14. A method according to claim 12, wherein the step of applying said paint for the formation of said nonferromagnetic undercoat layer, the step of applying said magnetic paint for the formation of said upper magnetic layer, and the step of applying said paint for the formation of said backcoat layer are sequentially carried out in order, said paint for the formation of said nonferromagnetic undercoat layer applied first and said magnetic paint for the formation of said upper magnetic layer are in a wet state during the course of the step of applying said paint for the formation of said backcoat layer, and then said magnetic field is applied to effect an orienting treatment before said magnetic paint for the formation of said upper magnetic layer has dried.

15. A method according to claim 12, wherein the step of applying said paint for the formation of said nonferromagnetic undercoat layer, the step of applying said paint for the formation of said backcoat layer, and the step of applying said magnetic paint for the formation of said upper magnetic layer are sequentially carried out in order, said paint for the formation of said nonferromagnetic undercoat layer applied first and said paint for the formation of said backcoat layer are in a wet state during the course of the step of applying said magnetic paint for the formation of said upper magnetic layer, and then said magnetic field is applied to effect an orienting treatment before said magnetic paint for the formation of said upper magnetic layer has dried.

16. A method according to claim 12, wherein the step of applying said paint for the formation of said nonferromagnetic undercoat layer and the step of applying said magnetic paint for the formation of said upper magnetic layer are simultaneously carried out after the step of applying said paint for the formation of said backcoat layer, said paint for the formation of said backcoat layer first applied is in a wet state during the course of the step of applying said paint for the formation of said nonferromagnetic undercoat layer and said magnetic paint for the formation of said upper magnetic layer, and then said magnetic field is applied to effect an orienting treatment before said magnetic paint for the formation of said upper magnetic layer has dried.

17. A method according to claim 12, wherein the step of applying said paint for the formation of said backcoat layer, the step of applying said paint for the formation of said nonferromagnetic undercoat layer, and the step of applying said magnetic paint for the formation of said upper magnetic layer are sequentially carried out in order, said paint for the formation of said backcoat layer applied first and said paint for the formation of said nonferromagnetic undercoat layer are in a wet state during the course of the step of applying said magnetic paint for the formation of said upper magnetic layer, and then said magnetic field is applied to effect an orienting treatment before said magnetic paint for the formation of said upper magnetic layer has dried.

18. A method according to claim 12, wherein the step of applying said magnetic paint for the formation of said upper magnetic layer and the step of applying said paint for the formation of said backcoat layer are sequentially carried out in order after the step of applying and drying said paint for the formation of said nonferromagnetic undercoat layer, said magnetic paint for the formation of said upper magnetic layer is in a wet state during the course of the step of applying said paint for the formation of said backcoat layer, and then said magnetic field is applied to effect an orienting treatment before said magnetic paint for the formation of said upper magnetic layer has dried.

19. A method according to claim 12. wherein the step of applying said paint for the formation of said backcoat layer and the step of applying said magnetic paint for the formation of said upper magnetic layer are sequentially carried out in order after the step of applying and drying said paint for the formation of said nonferromagnetic undercoat magnetic layer, said paint for the formation of said backcoat layer is in a wet state during the course of the step of applying said magnetic paint for the formation of said upper magnetic layer, and then said magnetic field is applied to effect an orienting treatment before said magnetic paint for the formation of said upper magnetic layer has dried.

20. A method according to any one of claims 1–19, which further comprises a step of drying the applied coating and calendering the dried coating on the in-line system after said step of the orienting treatment.

* * * * *